United States Patent
Tokuyama

(10) Patent No.: US 6,621,981 B1
(45) Date of Patent: Sep. 16, 2003

(54) VIDEO SIGNAL RECORDING/ REPRODUCING APPARATUS AND REPRODUCING APPARATUS

(75) Inventor: Yoshio Tokuyama, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/288,142

(22) Filed: Apr. 8, 1999

(30) Foreign Application Priority Data

Apr. 9, 1998 (JP) .......................................... 10-114136

(51) Int. Cl.⁷ ................................................. H04N 5/91

(52) U.S. Cl. ............................. 386/81; 386/74; 386/68; 360/22; 360/64

(58) Field of Search ............................ 386/81, 68, 6–8, 386/72, 78–79, 80, 74, 40; 360/6, 22, 64, 154, 332, 5, 311, 375; H04N 5/91

(56) References Cited

U.S. PATENT DOCUMENTS

| | | | | |
|---|---|---|---|---|
| 4,730,222 A | * | 3/1988 | Schauffele | 386/26 |
| 5,311,375 A | * | 5/1994 | Ikushima et al. | 360/64 |
| 5,506,687 A | * | 4/1996 | Gillard et al. | 386/21 |
| 5,543,932 A | * | 8/1996 | Chang et al. | 386/81 |
| 5,555,230 A | * | 9/1996 | Kashida et al. | 369/93 |
| 5,576,907 A | * | 11/1996 | Hasegawa | 360/64 |
| 5,886,843 A | * | 3/1999 | Ozue et al. | 360/64 |
| 6,363,206 B1 | * | 3/2002 | Kwon et al. | 386/68 |

* cited by examiner

Primary Examiner—Vincent Boccio
Assistant Examiner—James A Fletcher
(74) Attorney, Agent, or Firm—Jacobson Holman PLLC

(57) ABSTRACT

A recording/reproducing apparatus or a reproducing apparatus has a first, a second and a third magnetic heads. The first and second magnetic heads have different gap azimuth angles and are spaced 180 degrees apart from each other on a rotary head. The third magnetic head has the same gap azimuth angle as that of the second magnetic head and a specific relative positional relationship with the first magnetic head on the rotary head. Recording of each frame signal of a video signal is controlled as follows: The frame signal is divided into N (N being a integer of two or more) slant tracks on a magnetic tape at a standard tape speed in a standard mode; the frame signal is divided into N/2 slant tracks at a tape speed ½ of the standard speed in ½ speed mode; or the frame signal is divided into N/2 slant tracks at a tape speed ⅓ of the standard speed in ⅓ speed mode. Reproduction of the frame signal is carried out at a tape speed n (n being a speed coefficient and n≠1) times the tape speed at which the frame signal has been recorded in at least either the ½ or the ⅓ speed mode. The speed coefficient n is set to a value included in a predetermined range or given by at least either an equation (1) or (2): (1) $n=N(2m+1)/(2i-1)\pm 2/(2i-1)$; (2) $n=Nm/i\pm 1/i$ where a variable i is an integer from 1 to 10, and a variable m is an integer. The variable i may be set to 1 for the speed coefficient n that is (N−2) or more, whereas 2 or more for the speed coefficient n that is less than (N−2). The speed coefficient n may be set to a value given by the equation (1) or another value included in a predetermined range given by an equation (3); or a value given by the equation (2) or another value included in a predetermined range given by an equation (4): (3) $n=N(2m+1)/(2i-1)\pm 2/(1+\alpha)/(2i-1)$; (4) $n=10m/i\pm(1+\alpha)/i$ where $-0.4\leq\alpha\leq0.4$.

11 Claims, 20 Drawing Sheets

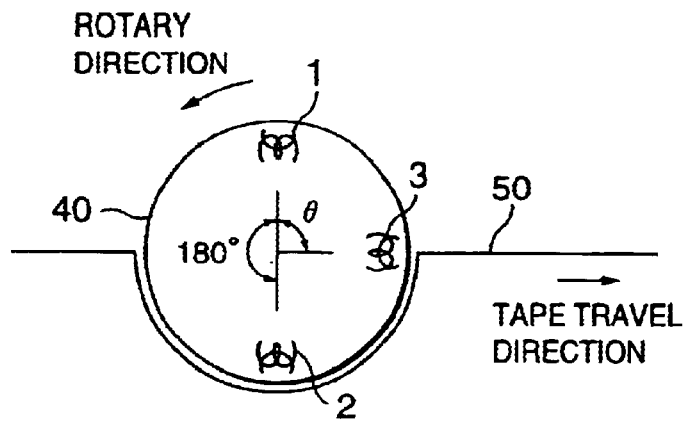
FIG.2A
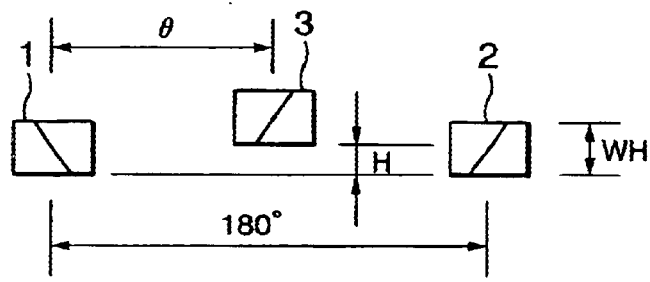
FIG.2B
FIG.3

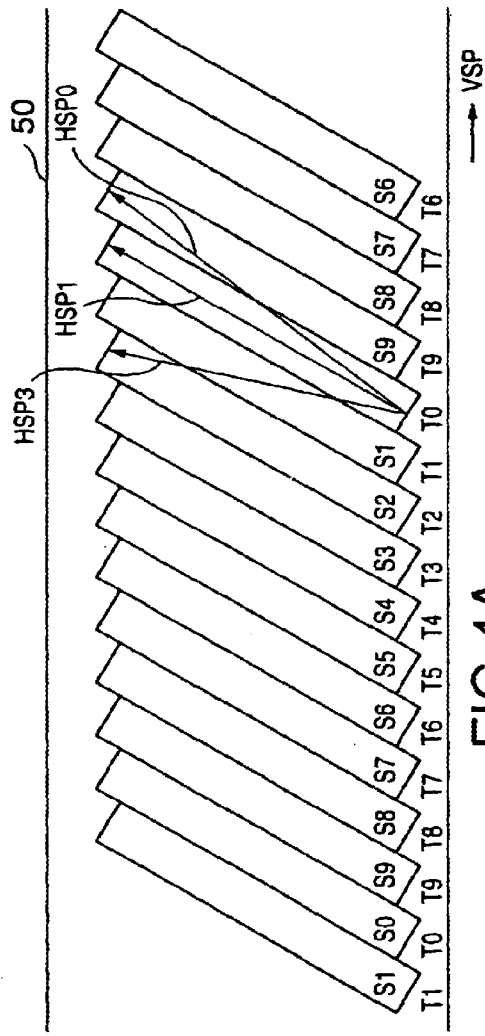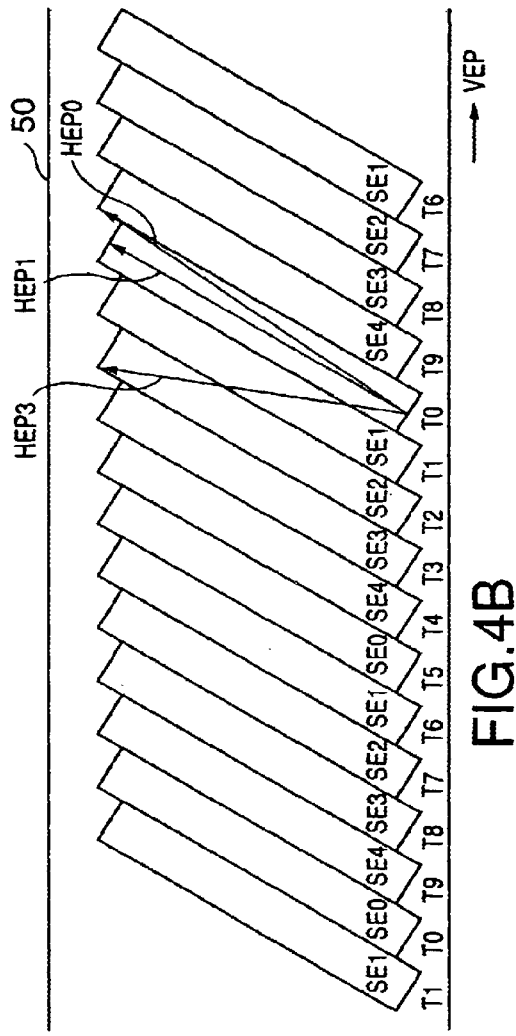

FIG.11A n=4.5

|    | X0 | X1 | X2 | X3 | X4 | X5 | X6 |
|----|----|----|----|----|----|----|----|
| S0 | 0  | 2  | 2  | 4  | 4  | 6  | 6  |
| S1 | 9  | 9  | 11 | 11 | 13 | 13 | 15 |
| S2 | 16 | 18 | 18 | 0  | 0  | 2  | 2  |
| S3 | 5  | 5  | 7  | 7  | 9  | 9  | 11 |
| S4 | 12 | 14 | 14 | 16 | 16 | 18 | 18 |
| S5 | 1  | 1  | 3  | 3  | 5  | 5  | 7  |
| S6 | 8  | 10 | 10 | 12 | 12 | 14 | 14 |
| S7 | 17 | 17 | 19 | 19 | 1  | 1  | 3  |
| S8 | 4  | 6  | 6  | 8  | 8  | 10 | 10 |
| S9 | 13 | 13 | 15 | 15 | 17 | 17 | 19 |

FIG.11B n=5.5

|    | X0 | X1 | X2 | X3 | X4 | X5 | X6 | X7 | X8 |
|----|----|----|----|----|----|----|----|----|----|
| S0 | 2  | 0  | 0  | 18 | 18 | 16 | 16 | 14 | 14 |
| S1 | 13 | 13 | 11 | 11 | 9  | 9  | 7  | 7  | 5  |
| S2 | 6  | 4  | 4  | 2  | 2  | 0  | 0  | 18 | 18 |
| S3 | 17 | 17 | 15 | 15 | 13 | 13 | 11 | 11 | 9  |
| S4 | 10 | 8  | 8  | 6  | 6  | 4  | 4  | 2  | 2  |
| S5 | 1  | 1  | 19 | 19 | 17 | 17 | 15 | 15 | 13 |
| S6 | 14 | 12 | 12 | 10 | 10 | 8  | 8  | 6  | 6  |
| S7 | 5  | 5  | 3  | 3  | 1  | 1  | 19 | 19 | 17 |
| S8 | 18 | 16 | 16 | 14 | 14 | 12 | 12 | 10 | 10 |
| S9 | 9  | 9  | 7  | 7  | 5  | 5  | 3  | 3  | 1  |

EP MODE
n=8(HEADS1, 2)

VIDEO SIGNAL RECORDING/REPRODUCING APPARATUS AND REPRODUCING APPARATUS

BACKGROUND OF THE INVENTION

The present invention relates to recording and reproducing apparatus for recording video signals on magnetic tapes and reproducing the recorded video signals, and also reproducing apparatus for reproducing video signals recorded on magnetic tapes.

Particularly, this invention relates to reproduction at travel speeds of magnetic tape that are different from travel speeds at which signals have been recorded. This reproduction is referred to as variable speed reproduction hereinafter.

Digital video tape recorders (VTR) according to DV or DVC standards have already been on the market. The DV standards offer the standard mode and another mode. The former mode is referred to as SP mode in which video signals are recorded on and reproduced from magnetic tapes at the standard travel speed VSP, 18.8 mm/sec., and the data rate of about 25 Mbps (Mega-bit per sec.). The latter mode is referred to as EP mode in which video signals are recorded on and reproduced from magnetic tapes having a track width the same as that for SP mode, at the travel speed that is half the standard speed VSP, and the data rate that is also half the rate for SP mode.

In recording NTSC signals of 525 scanning per 60 sec., one frame video signals are recorded on magnetic tapes so that each frame is divided into ten tracks in SP mode, whereas it is divided into five tracks in EP mode.

Video tape recorders capable of recording and reproduction in SP mode are provided with a speed coefficient, for example, "×9.5" for variable speed reproduction. This means the tape speed is 9.5 times faster than the standard speed VSP. Reproduction at tape speeds obtained by multiplying tape speeds for recording by integers results in reproduction of only a portion of a frame video signal that has been recorded on magnetic tapes so that the signal has been divided into ten tracks, and hence no fine image reproduction.

However, it has not been researched what tape speed is available for reproducing fine images by variable speed reproduction for VTRs capable of recording and reproduction in EP mode.

SP mode recording requires two magnetic heads (referred to as a channel A head and a channel B head hereinafter) having different gap azimuth angles and being arranged on a rotary drum so that they are spaced 180 degrees apart from each other.

On the contrary, EP mode recording with the channel A and B heads for SP mode cannot achieve recorded patterns in accordance with the standards. EP mode recording therefore employs a channel A head and a channel B' head having the same gap azimuth angle as that of the channel B head but being provided at a different location on the rotary drum. However, it has also not been researched whether fine images can be reproduced by such EP mode recording.

SUMMARY OF THE INVENTION

A purpose of the present invention is to provide a video signal recording and reproducing apparatus and also a reproducing apparatus capable of variable speed reproduction of fine images.

Another purpose of the present invention is to provide a video signal recording and reproducing apparatus and also a reproducing apparatus having plurality of magnetic heads and being capable of variable speed reproduction of fine images by switching the magnetic heads.

The present invention provides an apparatus for recording and reproducing a video signal to and from a magnetic tape. The apparatus includes a controller that selectively controls recording of each frame signal of the video signal in such a way that the frame signal is divided into N (N being a integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode. The controller further controls reproduction in such a way that the frame signal is reproduced at a tape speed n (n being a speed coefficient and n≠1) times the tape speed at which the frame signal has been recorded in at least either the ½ or the ⅓ speed mode. The speed coefficient n is set to a value included in a predetermined range or given by at least either an equation (1) or (2):

$$n = N(2m+1)/(2i-1) \pm 2/(2i-1) \quad (1)$$

$$n = Nm/i \pm 1/i \quad (2)$$

where a variable i is an integer from 1 to 10, and a variable m is an integer.

Furthermore, the present invention provides an apparatus for recording and reproducing a video signal to and from a magnetic tape. The apparatus includes a first magnetic head and a second magnetic head having different gap azimuth angles and being spaced 180 degrees apart from each other on a rotary head, and a third magnetic head having the same gap azimuth angle as the gap azimuth angle of the second magnetic head and having a specific relative positional relationship with the first magnetic head on the rotary head. The apparatus also includes a controller that selectively controls recording of each frame signal of the video signal in such a way that the frame signal is divided into N (N being a integer of two or more) slant tracks on the magnetic tape by the first and second magnetic heads at a standard tape speed in a standard mode, the frame signal is divided into N/2 slant tracks by the first and third magnetic heads at a tape speed ½ of the standard speed in ½ speed mode, or the frame signal is divided into N/2 slant tracks by the first and third magnetic heads at a tape speed ⅓ of the standard speed in ⅓ speed mode. The controller further controls reproduction in such a way that the frame signal is reproduced by the first and second magnetic heads at a tape speed different from the tape speed at which the frame signal has been recorded in at least either the ½ or the ⅓ speed mode.

Furthermore, the present invention provides an apparatus for recording and reproducing a video signal to and from a magnetic tape. The apparatus includes a first magnetic head and a second magnetic head having different gap azimuth angles and being spaced 180 degrees apart from each other on a rotary head, and a third magnetic head having the same gap azimuth angle as the gap azimuth angle of the second magnetic head and having a specific relative positional relationship with the first magnetic head on the rotary head. The apparatus also includes a controller that selectively controls recording of each frame signal of the video signal in such a way that the frame signal is divided into N (N being a integer of two or more) slant tracks on the magnetic tape by the first and second magnetic heads at a standard tape speed in a standard mode, the frame signal is divided into N/2 slant tracks by the first and third magnetic heads at a tape speed ½ of the standard speed in ½ speed mode, or the frame signal is divided into N/2 slant tracks by the first and third magnetic heads at a tape speed ⅓ of the standard speed in ⅓ speed mode. The controller further controls reproduction in such a way that the frame signal is reproduced by one of or two of the first, the second and the third magnetic heads at a tape speed n (n being a speed coefficient and n≠1) times the tape speed at which the frame signal has been recorded in at least either the ½ or the ⅓ speed mode. The speed coefficient n is set to a value included in a predetermined range or given by an equation n=Nm/i±1/i where a variable i is an integer from 1 to 10, and variable m is an integer.

Furthermore, the present invention provides an apparatus for reproducing a video signal from a magnetic tape. The apparatus includes a controller that controls reproduction of each frame signal of the video signal that has been recorded in such a way that the frame signal is divided into N (N being a integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode, the frame signal being reproduced at a tape speed n (n being a speed coefficient and n≠1) times the tape speed at which the frame signal has been recorded in at least either the ½ or the ⅓ speed mode. The speed coefficient n is set to a value included in a predetermined range or given by at least either an equation (1) or (2):

$$n=N(2m+1)/(2i-1)±2/(2i-1) \quad (1)$$

$$n=Nm/i±1/i \quad (2)$$

where a variable i is an integer from 1 to 10, and a variable m is an integer.

Furthermore, the present invention provides an apparatus for reproducing a video signal from a magnetic tape. The apparatus includes a first magnetic head and a second magnetic head having different gap azimuth angles and being spaced 180 degrees apart from each other on a rotary head, and a third magnetic head having the same gap azimuth angle as the gap azimuth angle of the second magnetic head and having a specific relative positional relationship with the first magnetic head on the rotary head. The apparatus also includes a controller that controls reproduction of each frame signal of the video signal that has been recorded in such a way that the frame signal is divided into N (N being a integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode, the frame signal being reproduced by the first and second magnetic heads at a tape speed different from the tape speed at which the frame signal has been recorded in either the ½ or the ⅓ speed mode.

Furthermore, the present invention provides an apparatus for reproducing a video signal from a magnetic tape. The apparatus includes a first magnetic head and a second magnetic head having different gap azimuth angles and being spaced 180 degrees apart from each other on a rotary head, and a third magnetic head having the same gap azimuth angle as the gap azimuth angle of the second magnetic head and having a specific relative positional relationship with the first magnetic head on the rotary head. The apparatus also includes a controller that controls reproduction of each frame signal of the video signal that has been recorded in such a way that the frame signal is divided into N (N being a integer of two or more) slant tracks on the magnetic tape by the first and second magnetic heads at a standard tape speed in a standard mode, the frame signal is divided into N/2 slant tracks by the first and third magnetic heads at a tape speed ½ of the standard speed in ½ speed mode, or the frame signal is divided into N/2 slant tracks by the first and third magnetic heads at a tape speed ⅓ of the standard speed in ⅓ speed mode, and controls reproduction in such a way that the frame signal is reproduced by one of or two of the first, the second and the third magnetic heads at a tape speed n (n being a speed coefficient and n≠1) times the tape speed at which the frame signal has been recorded at least either the ½ or the ⅓ speed mode. The speed coefficient n is set to a value included in a predetermined range or given by an equation n=Nm/i±1/i where a variable i is an integer from 1 to 10, and a variable m is an integer.

BRIEF DESCRIPTION OF DRAWINGS

FIGS. 2A and 2B illustrate the positional relationships among three magnetic heads mounted on a rotary drum according to the present invention;

FIG. 3 illustrates the relationship between frame regions and tracks;

FIGS. 4A and 4B illustrate track patterns formed on a magnetic tape in SP and EP mode, respectively;

FIGS. 11A and 11B illustrate frame data updating at the speed coefficients n=4.5 and n=5.5, respectively, in SP mode;

DETAILED DESCRIPTION OF PREFERRED EMBODIMENTS

Preferred embodiments according to the present invention will be described with reference to the attached drawings.

Shown in FIGS. 1 and 6 (which will be described later) are block diagrams of preferred embodiments of a recording unit and a reproducing unit, respectively, of a VTR according to the present invention. This VTR is capable of recording and reproduction in SP and EP modes in accordance with DV standard.

Figure 1:
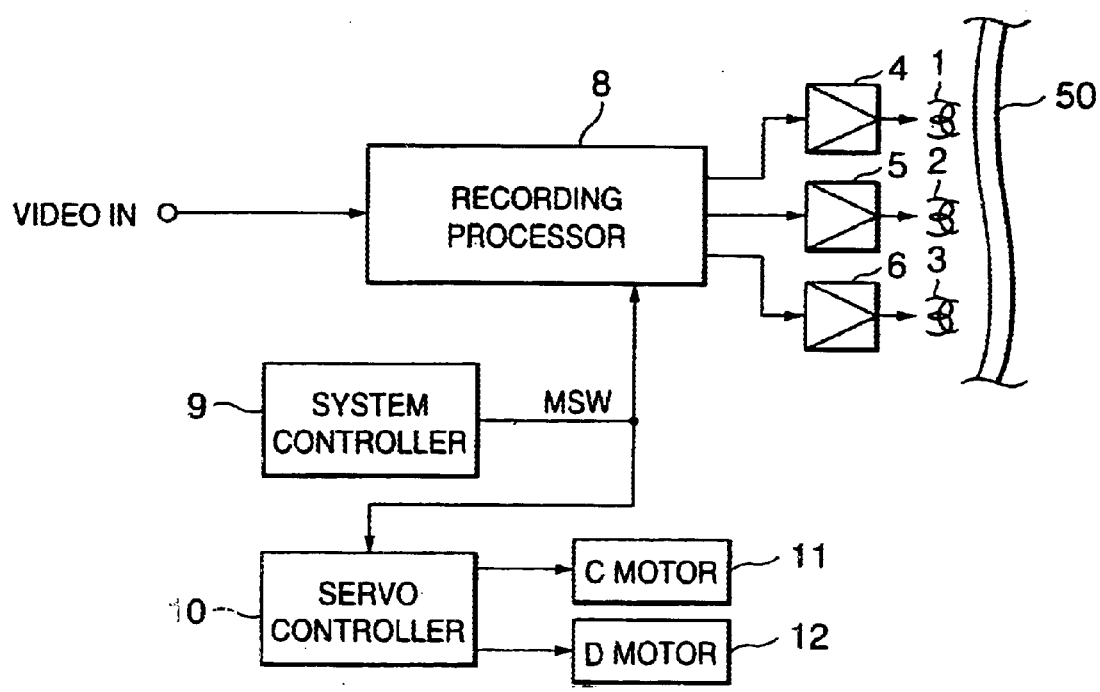
FIG. 1 is a block diagram of a preferred embodiment of a recording unit of a VTR according to the present invention.

The recording unit shown in FIG. 1 is provided with magnetic heads 1, 2 and 3, recording amplifiers 4, 5 and 6, a recording processor 8, a system controller 9, a servo controller 10, a capstan (C) motor 11 and a drum (D) motor 12.

The recording processor 8 carries out necessary recording processes such as separation of input analog video signals into luminance and color signals, conversion of the separated signals to digital signal, separation of the converted digital signals into sync blocks, discrete cosine transform (DCT) and quantization of the block signals, encoding the DCT- and quantized-signals with error correction, composition of the sync blocks, modulation of the composite signals for recording, etc.

The output signals of the recording processor 8 are amplified by the recording amplifiers 4 to 6 and then supplied to the magnetic heads 1 to 3, respectively.

The magnetic heads 1 to 3 record output signals of the recording amplifiers 4 to 6, respectively, on a magnetic tape 50, and to reproduce signals therefrom.

The system controller 9 controls the VTR entirely according to operation modes set via an operation panel (not shown) by supplying a mode signal MSW that indicates SP or EP mode to the recording processor 8 and the servo controller 10, and also other control signals to a reproducing unit (FIG. 6) of the VTR according to the present invention which will be described later.

The capstan motor 11 drives the magnetic tape 50. The drum motor 12 drives a rotary drum 40 (FIG. 2A) on which the magnetic heads 1 to 3 are mounted.

The magnetic heads 1 to 3 are mounted on the rotary drum 40 as shown in FIGS. 2A and 2B in accordance with the following positional relationships:

The magnetic heads 1 and 2 have different gap azimuth angles. However, the magnetic heads 2 and 3 have the same gap azimuth angle. The magnetic heads 1 and 2 are arranged so that they are spaced 180° apart from each other. The magnetic head 3 is spaced an angle θ, 90 degrees, apart from the magnetic head 1, and placed higher than the head 1 by a relative height H. A head width for each magnetic head is almost the same as a track width WT on the magnetic tape 50 in SP mode in this embodiment. The relative height H is obtained as H=WT×θ/360, that is, H=WT/4 in this embodiment.

In SP mode, one frame image is recorded so that it is separated into ten regions S0 to S9 as shown in FIG. 3, and video signals corresponding to the regions S0 to S9 are recorded on track Nos. T0 to T9 on the magnetic tape 50. The SP mode recording is carried out so that track patterns shown in FIG. 4A are formed on the magnetic tape 50 by the magnetic heads 1 and 2 while the tape 50 is traveling at the standard speed VSP.

On the other hand, in EP mode, video signals corresponding to regions SE0 to SE4, as shown in FIGS. 3 and 4B, are recorded on the track Nos. T0 to T4 and also T5 to T9 by the magnetic heads 1 and 3 while the magnetic tape 50 is travelling at a speed VEP that is half the standard speed VSP. Each of the regions SE0 to SE4 is a combination of two successive regions among the regions S0 to S9. For example, the region SE0 is a combination of the regions S0 and S1.

In detail, a video signal corresponding to the region SE0 (S0 and S1) is recorded on both the track Nos. T0 and T5; a video signal corresponding to the region SE1 (S2 and S3) is recorded on both the track Nos. T1 and T6; a video signal corresponding to the region SE2 (S4 and S5) is recorded on both the track Nos. T2 and T7; a video signal corresponding to the region SE3 (S6 and S7) is recorded on both the track Nos. T3 and T8; and a video signal corresponding to the region SE4 (S8 and S9) is recorded on both the track Nos. T4 and T9.

The EP mode actually requires five tracks (Nos. T0 to T4) for recording one frame video signal. However, in FIG. 3, the track Nos. T5 to T9 for SP mode are also used for explanation of EP mode recording to describe the difference there between.

Figure 5:
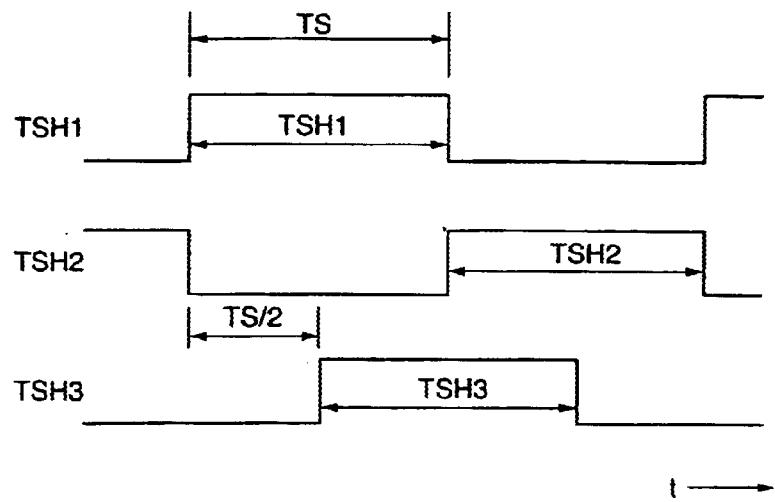
FIG. 5 illustrates timing charts that indicate periods of time for three magnetic heads to trace a magnetic tape.

Illustrated in FIG. 5 are timing charts that indicate periods of time TS for the magnetic heads 1, 2 and 3 to trace the magnetic tape 50. In SP mode, tracing periods TSH1 and TSH2 for the magnetic heads 1 and 2, respectively, appear alternately and repeatedly. On the other hand, in EP mode, a tracing period TSH3 for the magnetic head 3 appears as shown in the lowest timing chart.

Figure 6:
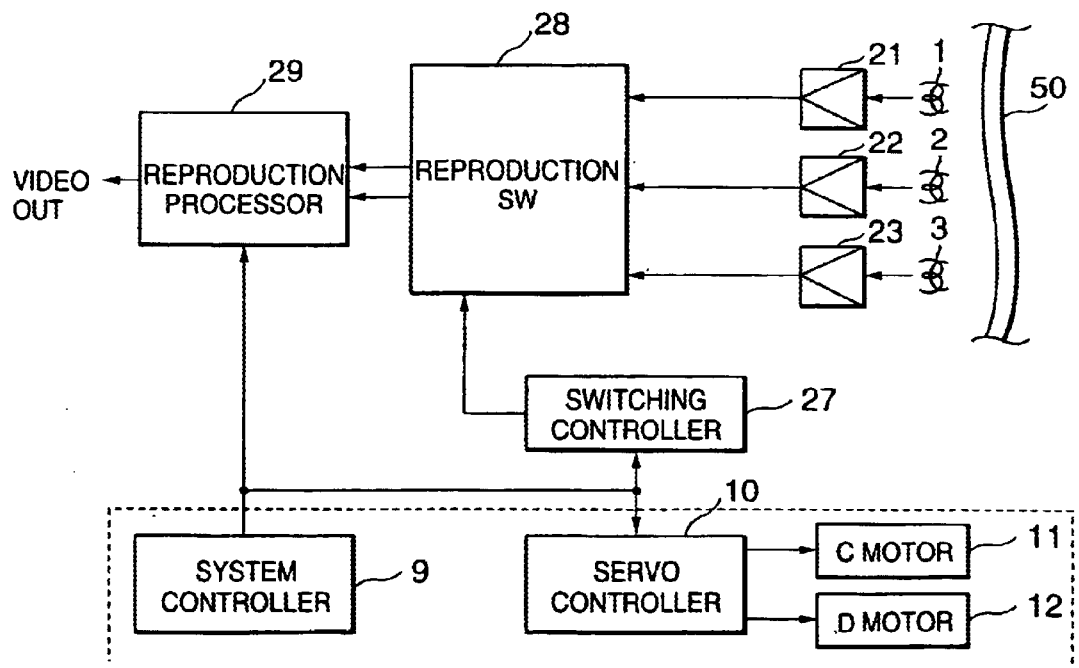
FIG. 6 is a block diagram of a preferred embodiment of a reproducing unit of a VTR according to the present invention.

Shown in FIG. 6 is a block diagram of a reproducing unit of a VTR according to the present invention, which receives signals, for example, the output signal of the recording unit shown in FIG. 1.

The reproducing unit shown in FIG. 6 is provided with reproduction amplifiers 21, 22 and 23, a switching controller 27, a reproduction switch 28 and a reproduction processor 29. The magnetic heads 1 to 3 in FIG. 6 are shared by the recording and reproduction units. Furthermore, in FIG. 6, the system controller 9, servo controller 10 and capstan and drive motors 11 and 12 are the components of the recording unit shown in FIG. 1 to show the signal in and output between the recording and reproducing units.

The reproduction amplifiers 21, 22 and 23 amplify the output signals of the magnetic heads 1, 2 and 3, respectively.

The switching controller 27 controls the reproduction switch 28 to switch the output signals of the reproduction amplifiers 21, 22 and 23, in response a control signal supplied by the system controller 9 (recording unit).

In detail, the switching controller 27 carries out the switching control to meet the periods TSH1 to TSH3 shown in FIG. 5. In SP mode reproduction by the magnetic heads 1 and 2, the switching controller 27 controls the reproduction switch 28 to select the output signal of either the head 1 or 2, and supply the selected signal to the reproduction processor 29.

On the other hand, in EP mode reproduction by the magnetic heads 1 and 3, the switching controller 27 controls the reproduction switch 28 to select both the output signals of the heads 1 and 3, and supply them to the reproduction processor 29. This is because the periods TSH1 and TSH3 for the magnetic heads 1 and 3, respectively, to trace the magnetic tape 50 overlap each other as shown in FIG. 5.

The reproduction processor 29 carries out necessary reproduction processes such as demodulation of reproduced digital signals from the reproduction switch 28, error correction of the demodulated signals, inverse-quantization and inverse-DCT of the error-corrected signals, and conversion of the inversely quantized and DCT-digital signal into analog video signals.

The magnetic heads 1, 2 and 3 trace the magnetic tape 50 in the variable speed reproduction in the directions different from those in recording. This results in reproduction of video signals not for all of one frame even for a period corresponding to ten tracks in SP mode and five tracks in EP mode.

For the reason above, the reproduction processor 29 employs a frame memory (not shown). Memory fields on the frame memory are sequentially rewritten, or updated, by the reproduced data. The data stored on the memory fields are read at a predetermined order as output reproduced video signals. The reproduction processor 29 is controlled by the system controller 9 (recording unit) so as not to rewrite (update) the memory fields of the frame memory whenever error rate detected by an error correction and decoding circuit (not shown) of the processor 29 increases to a predetermined rate or more.

Discussed below is the speed coefficient "n" for variable speed reproduction. The speed coefficient "n" offers tape travel speeds "n" times faster than the normal reproduction for reproducing fine images in SP and EP modes. The discussion will be proceeded under the condition that correct (errors can be ignored) video signals are reproduced when the levels of signals reproduced by the magnetic heads are 50% or more of the maximum level.

(SP Mode)

Arrows HSP1, HSP3 and HSP0 shown in FIG. 4A indicate paths traced by the magnetic heads on the magnetic tape 50 for normal reproduction, 3×fast reproduction ("3×fast" means a tape travel speed three times faster than the normal reproduction), and still reproduction while the magnetic tape 50 is being stopped, respectively.

The variable speed reproduction carries out tracing so that the magnetic heads cross over adjacent tracks to generate diamond-like wave envelops of reproduced signals which will be disclosed in detail later. This is because adjacent tracks have been recorded by the magnetic heads 1 and 2 having different gap azimuth angles.

Figure 7:
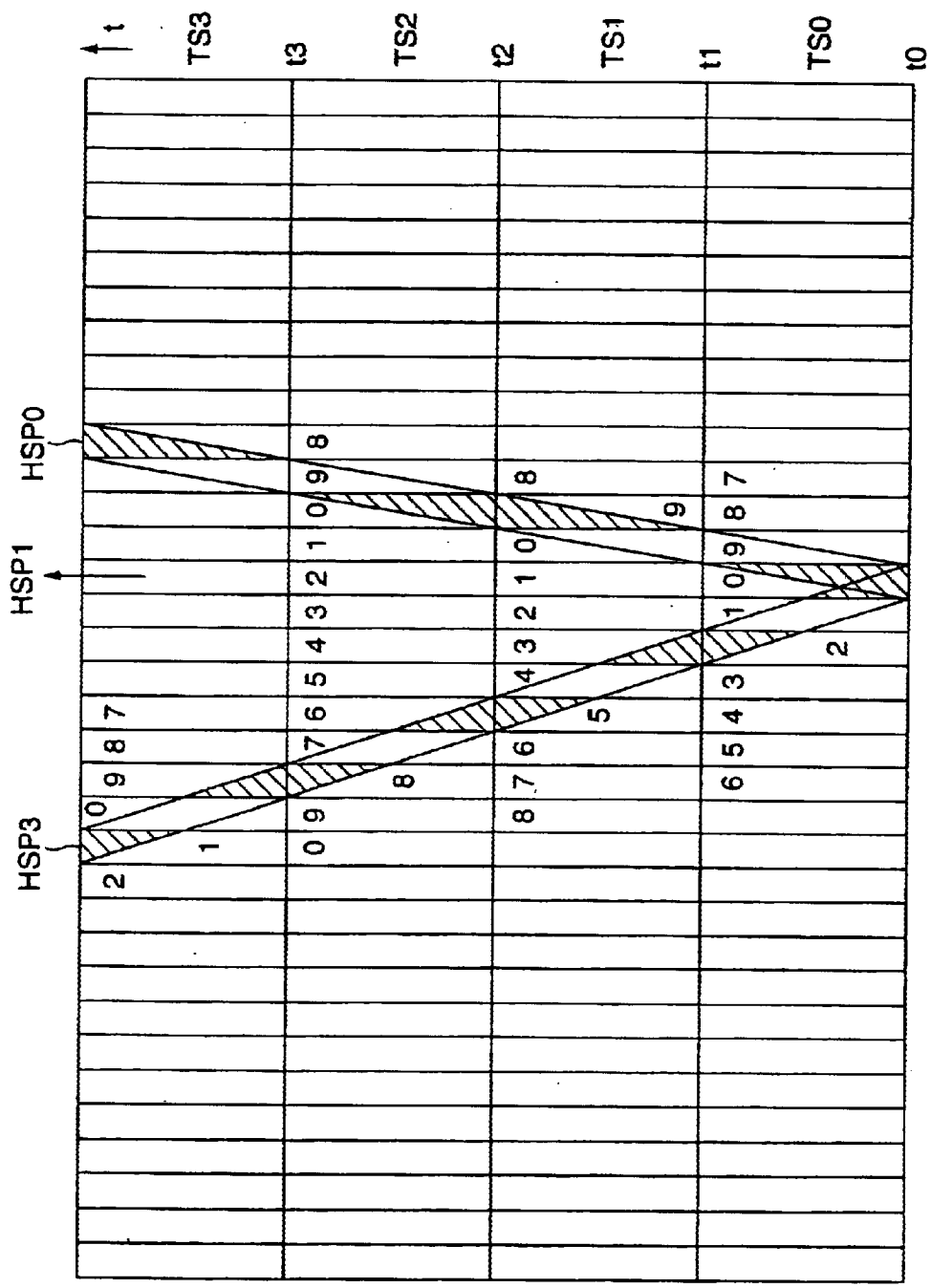
FIG. 7 Illustrates paths traced by magnetic heads and tracks recorded on a magnetic tape in SP mode.

Illustrated in FIG. 7 are the paths traced by the magnetic heads and tracks recorded on the magnetic tape 50. One block in FIG. 7 indicates one track, and numerals written in the blocks are track numbers.

The magnetic heads 1 and 2 trace the tracks, in the order of track Nos. T0, T1, T2, . . . , on the path indicated by the arrow HSP1 in the normal reproduction. The magnetic head 1 traces the tracks for tracing periods TS0, TS2, . . . , whereas the magnetic head 2 traces the tracks for tracing periods TS1, TS3, . . . .

The paths traced by the magnetic heads 1 or 2 for the 3×fast reproduction and still reproduction are indicated by the arrows HSP3 and HSP0, respectively. Hatching drawn in some blocks indicates portions of the tracks actually reproduced by the magnetic heads 1 or 2. The hatching areas depict envelope waveforms of reproduced signals which will be referred to as reproduced waveforms hereinafter.

Figure 8:
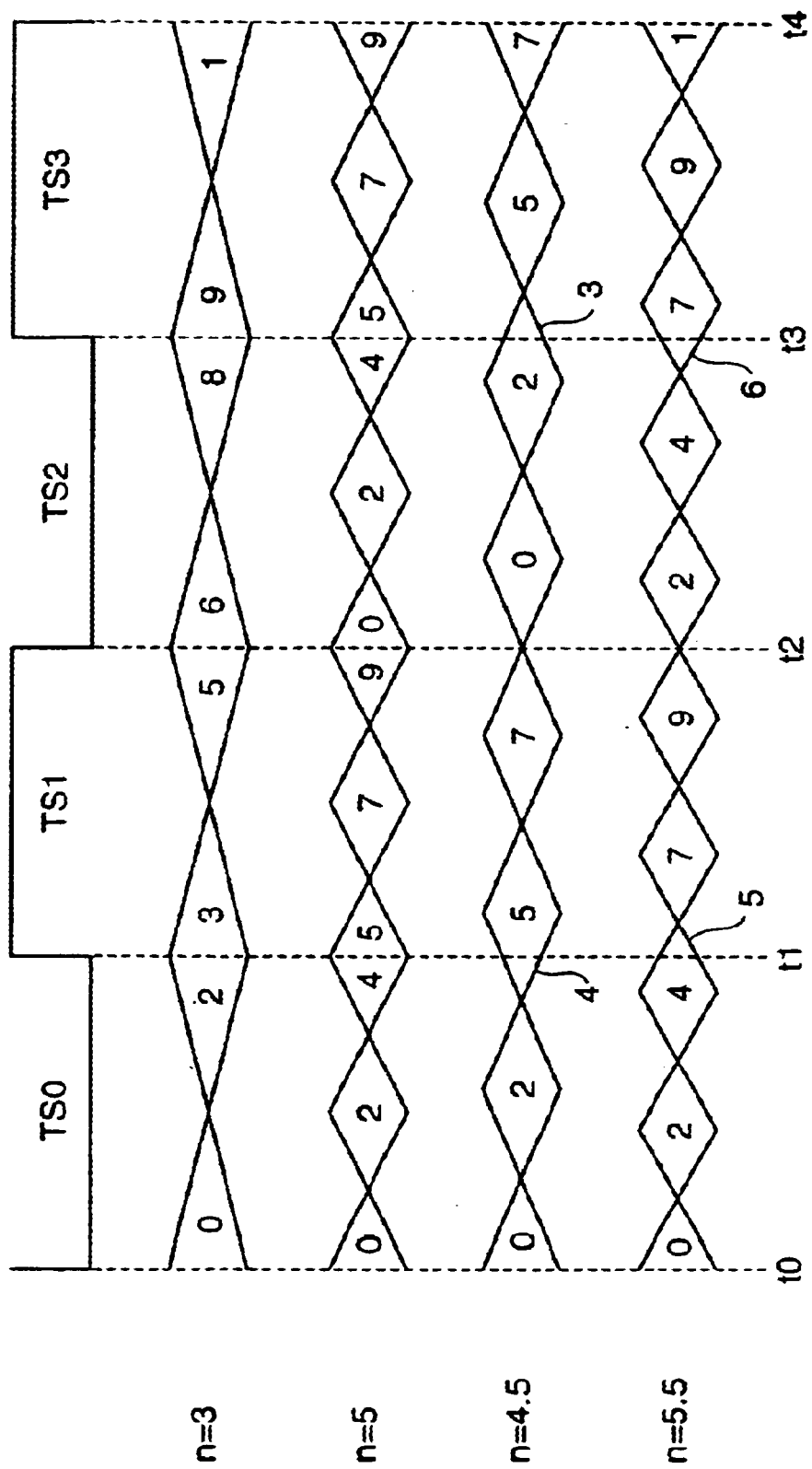
FIG. 8 illustrates envelope waveforms of signals reproduced by 3×fast (n=3), 5×fast (n=5), 4.5×fast (n=4.5) and 5.5×fast (n=5.5) reproduction in SP mode.

Waveforms reproduced by the variable speed reproduction, such as, 3×fast (n=3) reproduction on the path HSP3, 5×fast (n=5) reproduction, 4.5×fast (n=4.5) reproduction and 5.5×fast (n=5.5) reproduction are illustrated in FIG. 8. Numerals written in diamond waves of envelop are track numbers.

As understood from FIG. 8, when the speed coefficient "n" is set to an integer, areas in one frame for which signals can be reproduced are always the same places. This is also true for other areas in one frame for which signals cannot be reproduced are always the same places. For example, when, n=3, data for the middle area in the horizontal direction in frame cannot be reproduced.

Also, as understood from FIG. 8, when the speed coefficient "n" is set to any number other than an integer, for example, n=4.5 or n=5.5, diamond waves are shifted as time passes. This phase shift allows all the data stored in the frame memory of the reproduction processor 29 (FIG. 6) are rewritten as time passes. Such phase shift always happens whenever the speed coefficient "n" is set to any number other than an integer.

Figure 9:
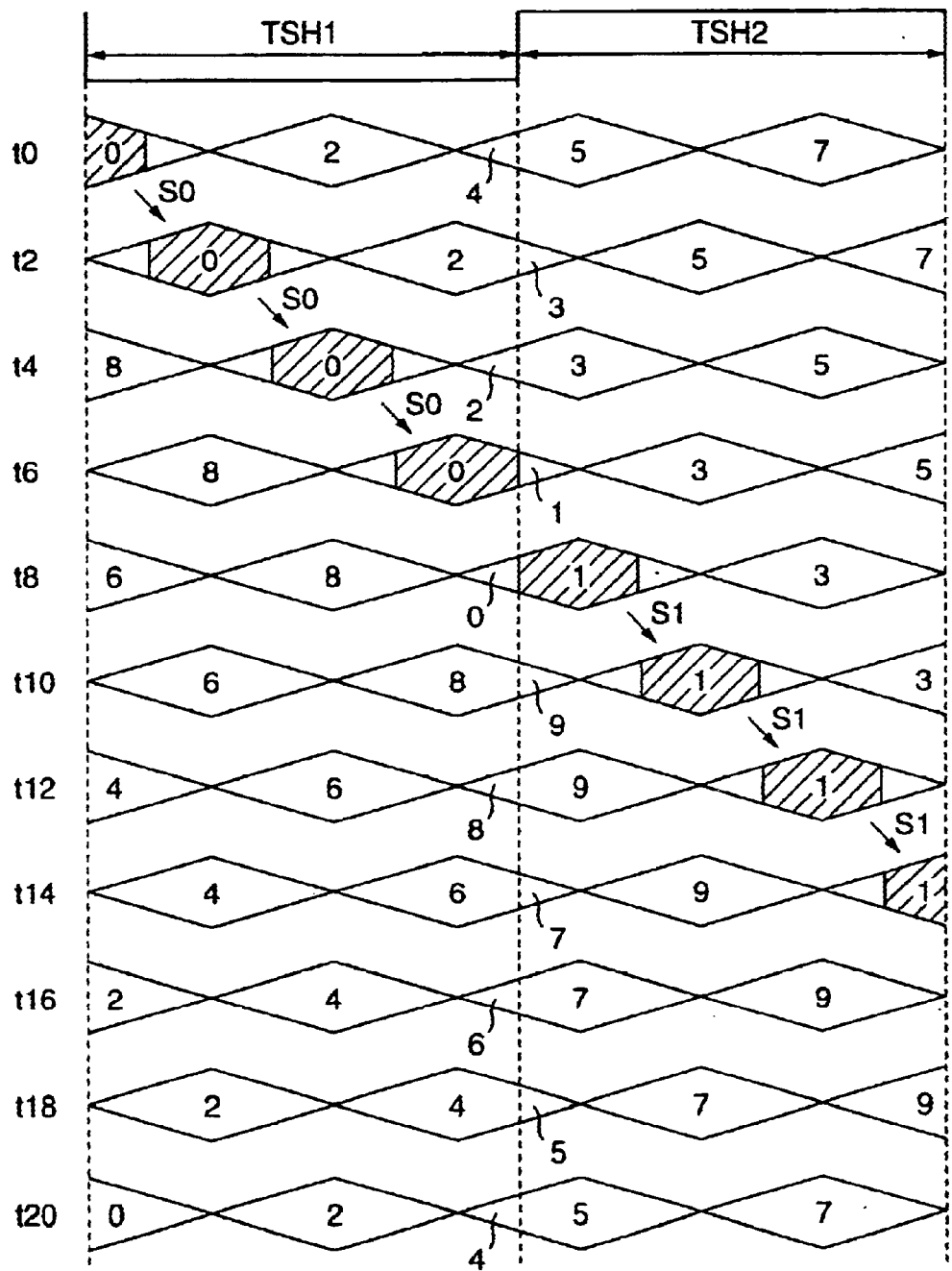
FIG. 9 illustrates phase shift at the speed coefficient n=4.5 that allows the most effective data rewriting in SP mode.

Illustrated in FIG. 9 is one example of the phase shift that allows the most effective data rewriting.

FIG. 9 shows the succeeding diamond waves from the moment t0 to t20, . . . . The moments t0, t2, t4, . . . (tracing starting periods) at the leftmost of the waves are the moments for the magnetic head 1 to start tracing the magnetic tape 50 for even-numbered tracing periods TS0, TS2, TS4, . . . . Not indicated, but the moments t1, t3, t5, . . . are the moments for the magnetic head 2 to start tracing the magnetic tape 50 for odd-numbered tracing periods TS1, TS3, TS5, . . . .

FIG. 9 depicts a phenomenon in which diamond waves with the same track number are shifted from left to right by a half cycle (one cycle=one diamond wave) and sequentially reproduced when the speed coefficient "n" is set to 4.5. The cycle of frame updating is 20 tracing periods because the track number is "0" at the moment t0 and returns to "0" at the moment t20.

Figure 10:
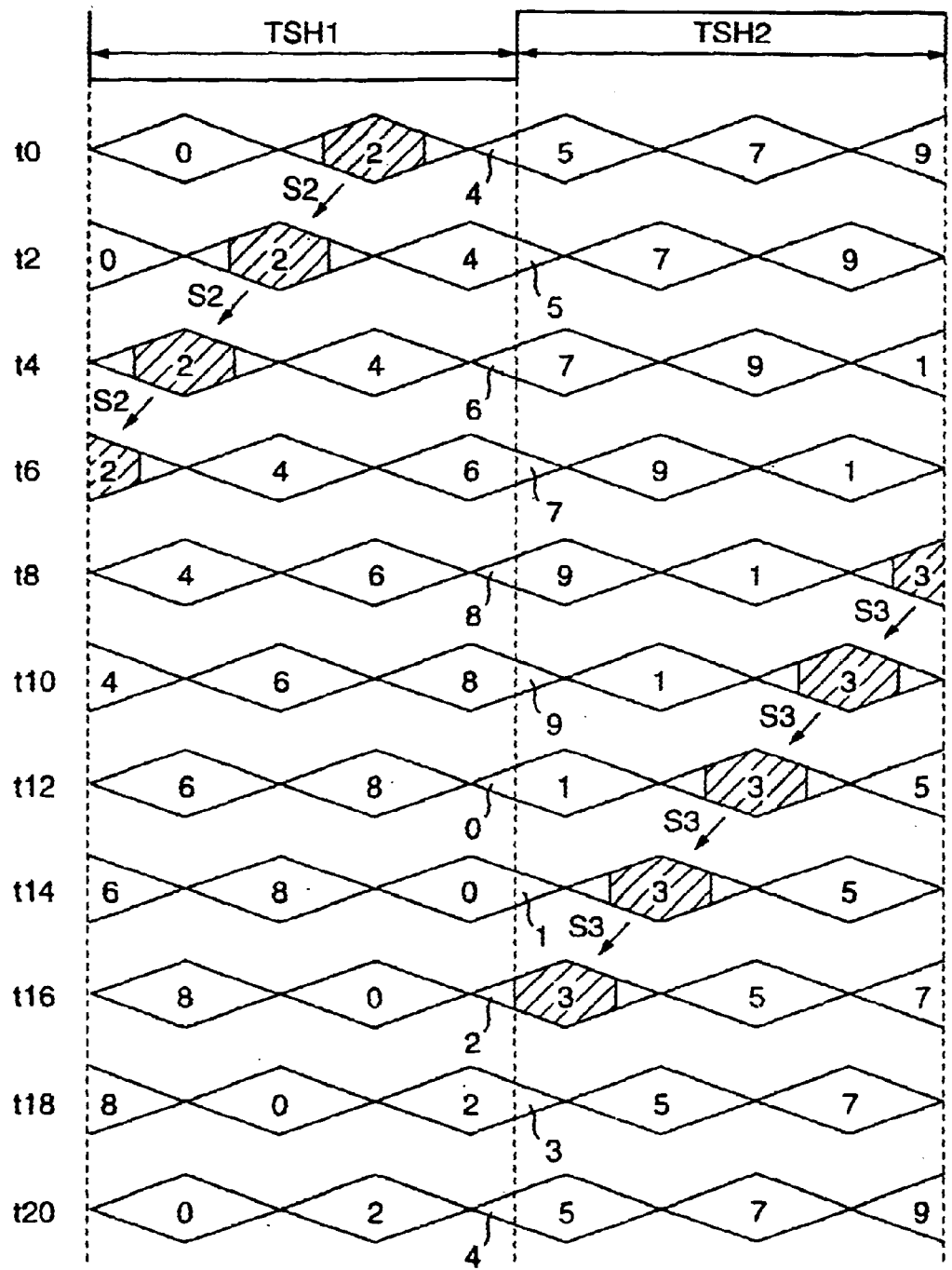
FIG. 10 illustrates phase shift at the speed coefficient n=5.5 that allows the effective data rewriting in SP mode.

On the other hand, depicted in FIG. 10 a phenomenon in which diamond waves with the same track number are shifted from right to left by the same half cycle and sequentially reproduced when the speed coefficient "n" is set to 5.5. The cycle of frame updating is also 20 tracing periods.

Frame data updating at the speed coefficients n=4.5 and n=5.5 are illustrated in FIGS. 11A and 11B, respectively. Blocks in each figure are areas of one frame. Numerals written in the blocks are the numbers of tracing periods starting from "0" for data updating.

Disclosed below with reference to FIGS. 9 and 11A is data updating for the horizontal succeeding areas S0 and also the other horizontal succeeding areas S1 when the speed coefficient is set to 4.5.

The portions with hatching (FIG. 9) are the tracks for frame updating and having the track number T0 or T1 that corresponds to the area S0 or S1, respectively. Signals with the level 50% or more can be reproduced from these tracks.

Data in the horizontal succeeding areas S0 are updated in the direction indicated by an arrow (FIG. 11A) in the following order:

Data in the area (X0, S0) is updated first for the tracing period TS0. Data in the areas (X1, S0) and (X2, S0) are updated next for the tracing period TS2. Data in the areas (X3, S0) and (X4, S0) are updated for the tracing period TS4. And, data in the areas (X5, S0) and (X6, S0) are updated for the tracing period TS6.

Data in the other horizontal succeeding areas S1 are updated in the direction indicated by another arrow (FIG. 11A) in the following order:

Data in the areas (X0, S1) and (X1, S1) are updated first for the tracing period TS9. Data in the areas (X2, S1) and (X3, S1) are updated next for the tracing period TS11. Data in the areas (X4, S1) and (X5, S1) are updated for the tracing period TS13. And, data in the area (X6, S1) is updated for the tracing period TS15.

The same processing goes to the horizontal succeeding areas S2 to S9. The data updating for all the areas is completed after the tracing period TS19 has passed. Data are updated mostly from left to right of the frame, thus reproducing fine images.

Disclosed next with reference to FIGS. 10 and 11B is data updating for the horizontal succeeding areas S2 and also the other horizontal succeeding areas S3 when the speed coefficient is set to 5.5.

The portions with hatching (FIG. 10) are the tracks for frame updating and having the track number T2 or T3 that corresponds to the area S2 or S3, respectively. Signals with the level 50% or more can be reproduced from these tracks.

Data in the horizontal succeeding areas S2 are updated in the direction indicated by an arrow (FIG. 11B) in the following order:

Data in the areas (X5, S2) and (X6, S2) are updated first for the tracing period TS0. Data in the areas (X3, S2) and (X4, S2) are updated next for the tracing period TS2. Data in the areas (X1, S2) and (X2, S2) are updated for the tracing period TS4. And, data in the area (X0, S2) is updated for the tracing period TS6.

Data in the other horizontal succeeding areas S3 are updated in the direction indicated by another arrow (FIG. 11B) in the following order:

Data in the area (X8, S3) is updated first for the tracing period TS9. Data in the areas (X6, S3) and (X7, S3) are updated next for the tracing period TS11. Data in the areas (X4, S3) and (X5, S3) are updated for the tracing period TS13. Data in the areas (X2, S3) and (X3, S3) are updated for the tracing period TS15. And, data in the areas (X0, S3) and (X1, S3) are updated for the tracing period TS17.

The same processing goes to the other horizontal succeeding areas S0, S1 and S4 to S9. The data updating for all the areas is completed after the tracing period TS19 has passed. Data are updated mostly from right to left of the frame, thus reproducing fine images.

Figure 12:
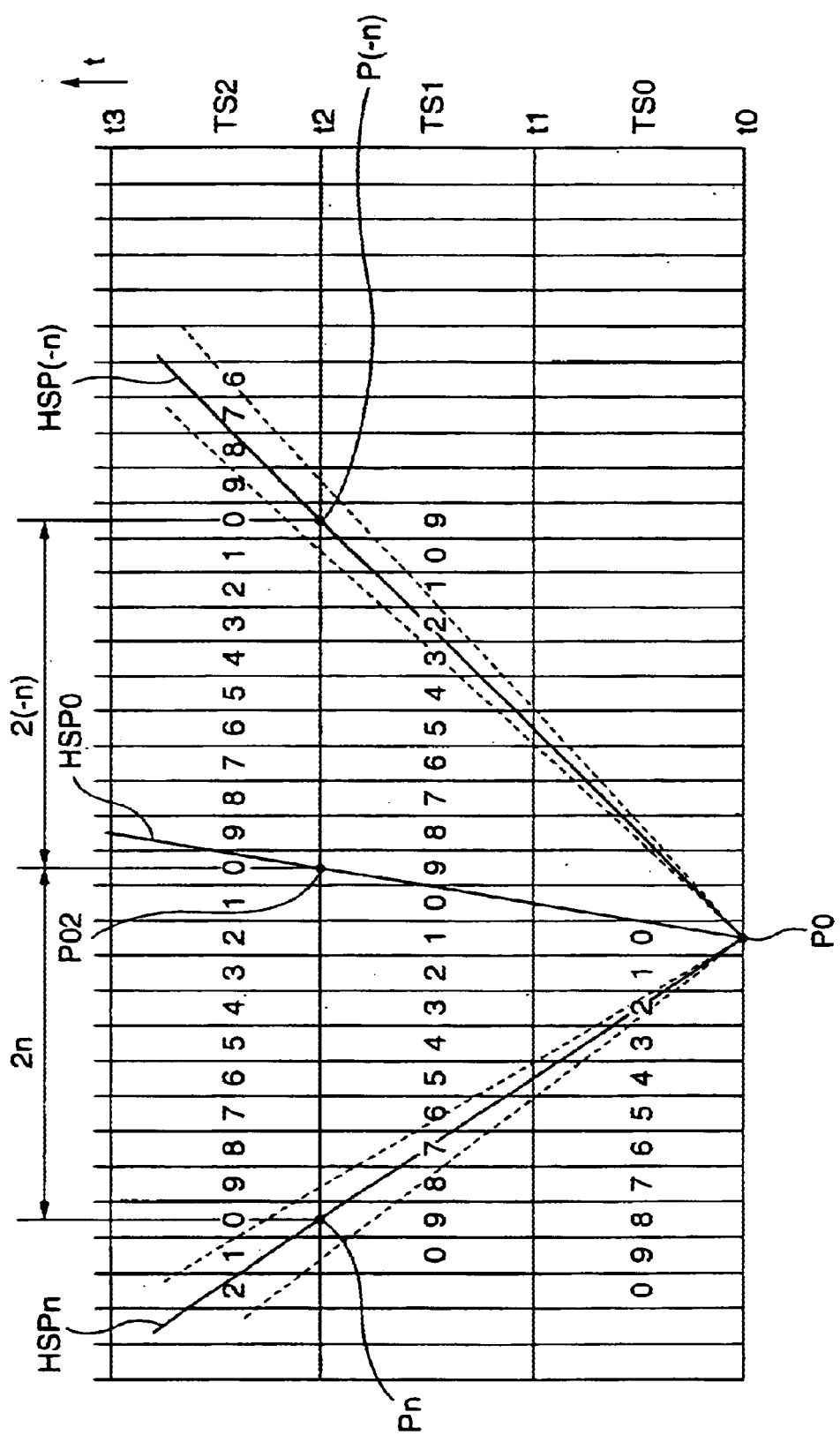
FIG. 12 illustrates paths traced by a magnetic head and tracks recorded on a magnetic tape in SP mode.

Illustrated in FIG. 12 are the paths traced by the magnetic head and tracks recorded on a magnetic tape. In the variable speed reproduction according to the present invention when the speed coefficient "n" is set to any number other than 4.5 and 5.5.

The center of the magnetic head 1 is located at the point P0 at the tracing starting moment t0. The paths on which the magnetic head 1 (head center) traces the magnetic tape 50 are indicated by HSP0, HSPn and HSP(-n) for the still reproduction, the forward n×fast reproduction and the reverse n×fast reproduction, respectively. During the reverse n×fast reproduction, the magnetic tape 50 travels in the direction that is opposite to the recording tape travel direction.

The distance between the points P02 and Pn or P(-n) is 2n that is the number of tracks at the next tracing starting moment t2. The distance 2n exists when the center of the magnetic head 1 is located at the point P02 during the still reproduction and when it is located at the point Pn or P(-n), "n" being 5 in FIG. 12, during the forward or reverse n×fast reproduction at the tracing starting moment t2. A location of the magnetic head 1 during the forward or reverse n×fast reproduction is shifted by "n" tracks for one tracing period from its location during the still reproduction.

A magnetic head is located at the identical position in the tracks of the same track number after two tracing periods have passed when the equation 2n=10m is established, where "m" is an integer that includes any negative integral number.

Diamond wave envelopes of reproduced signals are in phase when the above equation is established. Hence, the diamond wave envelopes are shifted from each other by a half cycle when the equation 2n=1m±1 is established. This equation is modified to $$n=10m/2\pm\tfrac{1}{2} \qquad (1)$$

A magnetic head traces a magnetic tape on the paths depicted by doted lines in FIG. 12 when the equation (1) is established. The equation (1) gives n=±4.5 or ±5.5 when m=±1.

The speed coefficient "n" must be in the range from 10 to 20 or more to quickly search images. For such fast search, the equation (1) gives n=±9.5 or ±10.5 when m=±2, and n=±19.5 or ±20.5 when m=±4.

On the other hand, the speed coefficient "n" must be about in the range from 1.5 to 3 or −1 to −3 to examines images. Such speed coefficient "n" however cannot be given by the equation (1), that is, there is no "m" for giving such speed coefficient.

For this reason, the equation (1) will be more generalized. Diamond wave envelopes of reproduced signals in the same number tracks are shifted from each other by a half cycle after two tracing periods when the equation (1) is established. Hence, the diamond wave envelops in the same number tracks are shifted from each other by a half cycle after tracing periods larger than two, that is, 4, 6, 8, . . . , when the equation 2i×n=10m/2±1 (i=1, 2, 3, . . . ) is established. This equation is modified to $$n=10m/2i\pm\tfrac{1}{2}i \qquad (2)$$

The equation (1) is given from the equation (2) when the variable "i" is 1. The larger the variable "i", the longer the period for obtaining a desired phase relationship among diamond wave envelopes, thus delaying frame data updating.

Figure 13:
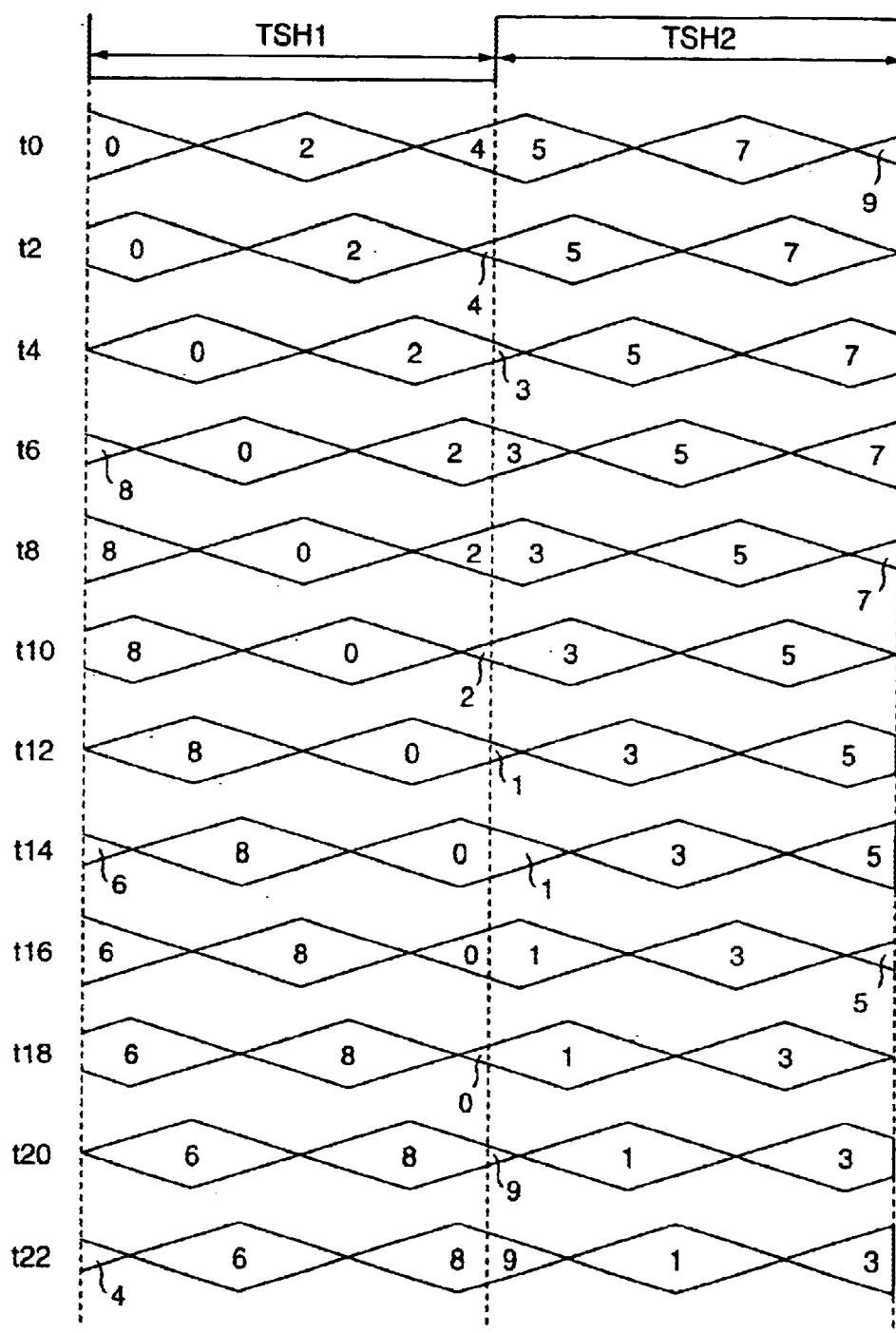
FIG. 13 illustrates phase shift at the speed coefficient n=4.75 in SP mode.

The equation (2) gives n=4.75 or 5.25 when i=m=2. Illustrated in FIG. 13 is phase shift at the speed coefficient n=4.75 where diamond wave envelopes of reproduced signals are shifted from each other by ¼ cycle for every second tracing period. This is easily understood from comparison of FIGS. 9 and 13 with each other. FIG. 13 shows that tracing periods for reproducing signals with levels of 50% or more are overlapped with each other, thus requiring time for frame data updating two times longer at n=4.75 than that at n=4.5 (FIG. 9). The larger the variable "i", the longer the time for frame data updating. Hence, the smaller the variable "i", the better.

The following equation (3) is given from the equation (2) when i=2:

$$n=10m/4\pm\tfrac{1}{4} \qquad (3)$$

The equation (3) gives n=±2.25 and ±2.75 when m=±1.

The following equation (4) is given from the equation (2) when i=3:

$$n=10m/6\pm\tfrac{1}{6} \qquad (4)$$

The equation (4) gives n=±1.5 and ±1.83 (=11/6) when m=±1.

Furthermore, the following equation (5) is given from the equation (2) when i=4:

$$n=10m/8\pm\tfrac{1}{8} \qquad (5)$$

The equation (5) gives n=±1.125 and ±1.375 when m=±1.

As described above, the variable "i" in the range from 1 to 4 gives speed coefficients that are normally required.

However, variable "i" setting in the range from 2 to 4 results in speed coefficients with quite a few decimals. The following equation (6) that is given from the equation (2) when i=5 may be used for obtaining the speed coefficient "n" smaller than 4.5 that is the least common multiple when i=1.

$$n=10m/10\pm 1/10=m\pm 0.1 \quad (5)$$

The variable "i" of 6 or more will result in too long frame data updating time in SP mode, and hence such variable setting is not recommended.

(EP Mode)

Track widths for EP mode are the same as those for SP mode. However, tape speeds for the former mode are half of those for the latter mode. As already described with reference to FIG. 3, in EP mode, data for an area in a frame is recorded as both two tracks, such as, on track numbers T0 and T5; T1 and T6; T3 and T7; T4 and T8; and T5 and T9, which is not true for SP mode. EP ode recording uses the magnetic heads 1 and 3. However, the magnetic heads 1 and 2 are preferable for EP mode variable speed reproduction to reproduce fine images at several speed coefficients.

Disclosed first is EP mode variable speed reproduction with the magnetic heads 1 and 2.

Figure 14:
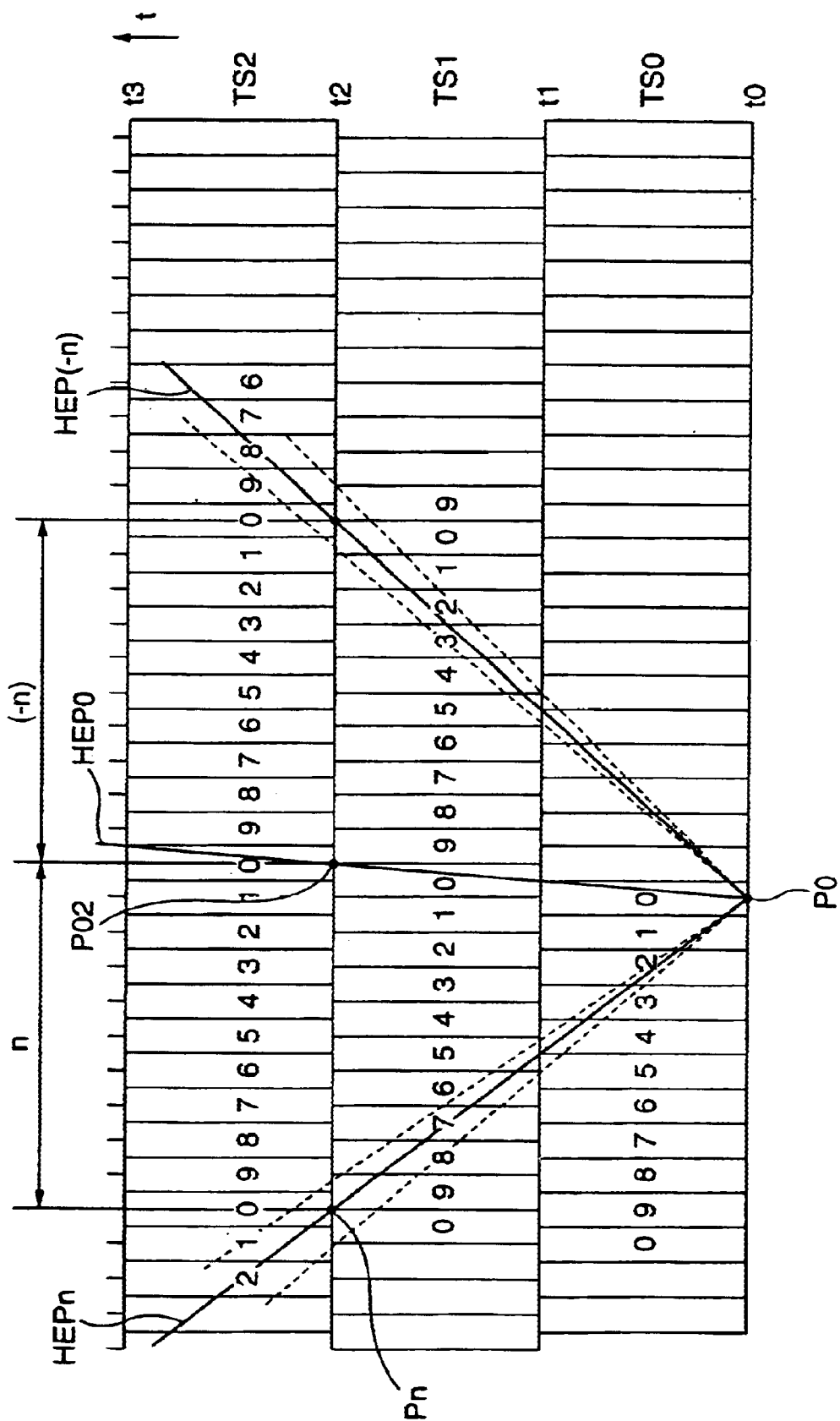
FIG. 14 illustrates paths traced by magnetic heads and tracks recorded on a magnetic tape in EP mode.

Illustrated in FIG. 14 are the paths traced by the magnetic heads 1 and 2, and tracks on a magnetic tape in EP mode, like FIG. 12 for SP mode. In FIG. 14, tracks for even-numbered tracing periods and those for odd-numbered tracing periods are shifted form each other by a half track. This is because when the magnetic head 1 reaches each tracing halt moment t1, t3, . . . , the magnetic head 2 starts tracing at the position that is shifted by a half track. In other words, because tracking control in normal reproduction (n=1) produces the maximum output from the magnetic head 1, whereas a half of the maximum output from the magnetic head 2.

After even-numbered tracing periods have passed, diamond wave envelops of reproduced signals in the same numbered tracks are shifted from each other by a half cycle to reproduce fine images when the equation i×n=10m±1 (i=1, 2, 3, . . . ) is established.

The speed coefficient "n" for phase shift after an elapse of even-numbered tracing periods is then given by the following equation:

$$n=10m/i\pm 1/i \quad (7)$$

Data for an area in a frame in EP mode is recorded on both two tracks, such as, on track numbers T0 and T5; T1 and T6; T3 and T7; T4 and T8; and T5 and T9. Therefore, in order to reproduce fine images, diamond wave envelops of signals reproduced from the same area in a frame may be shifted from each other by a half cycle also after odd-numbered tracing periods have passed.

Figure 15:
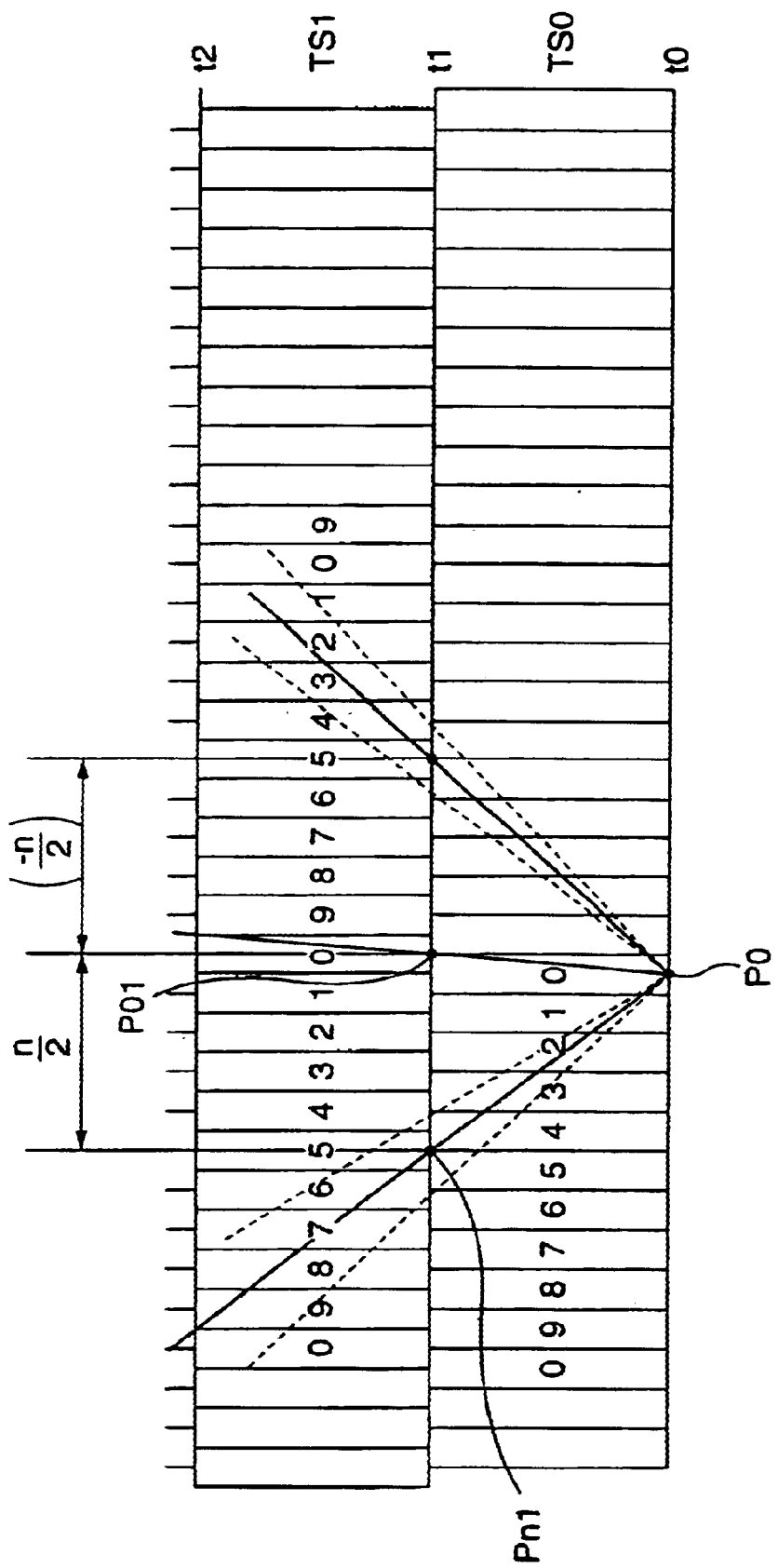
FIG. 15 illustrates other paths traced by magnetic heads and tracks recorded on a magnetic tape in EP mode.

Such phase shift happens as shown FIG. 15 after an elapse of odd-numbered tracing periods when the following equation is established:

$$(2i-1)n/2=(10m+5)\pm 1$$

The speed coefficient "n" for phase shift after an elapse of odd-numbered tracing periods is then given by the following equation:

$$n=10(2m+1)/(2i-1)\pm 2/(2i-1) \quad (8)$$

The larger the variable "i" in the equation (7) or (8), the longer the frame data updating time, the same as for SP mode. Therefore, the smaller the variable "i", the better, and the equation (8) with i=10 or less gives adequate speed coefficients. When i=1 and m=0, the equation (8) gives n=8 that is the least common multiple. The variable "i" is thus preferably set to two or more for obtaining the variable coefficient "n" less than eight.

Figure 16:
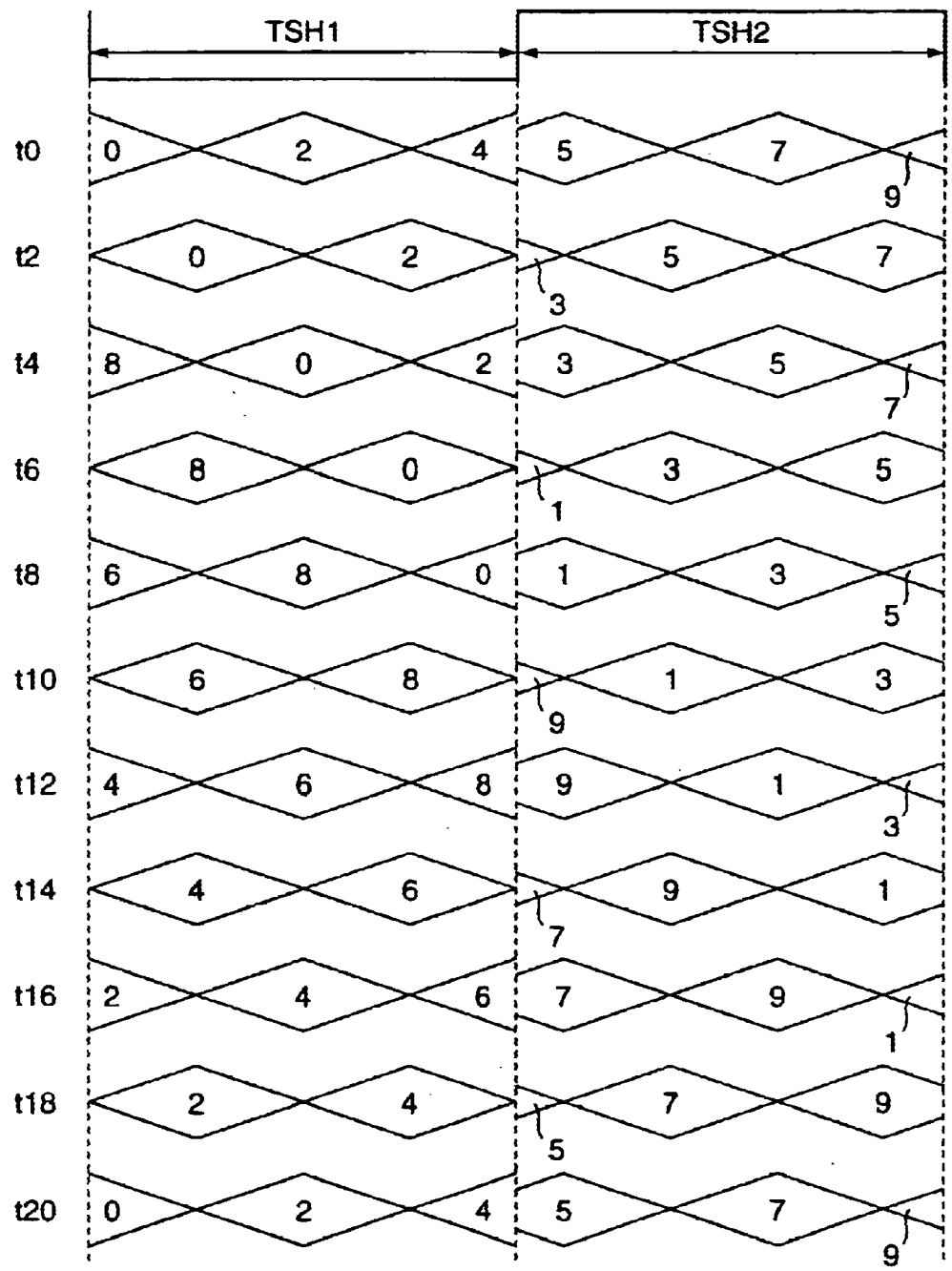
FIG. 16 illustrates phase shift at the speed coefficient n=9 in EP mode.

FIG. 16 illustrates phase shift of diamond wave envelopes of signals reproduced at the speed coefficient n=9 in EP mode. The speed coefficient n=9 is given by the equation (7) where i=m=1 and the second member is negative, that is, −1/i. All the areas in one frame can be updated, and the phase shift returns at time t20 to the initial state (time t0). This means that the frame updating cycle corresponds to 20 tracing periods.

As shown in FIG. 16, the envelopes are discontinuous at the moments, or the border between the tracing periods TSH1 and TSH2 where the magnetic head is switched from the head 1 to the head 2. This is because when the track tracing by the magnetic head 2 starts the track tracing at the position shifted by a half track.

Figure 17A:
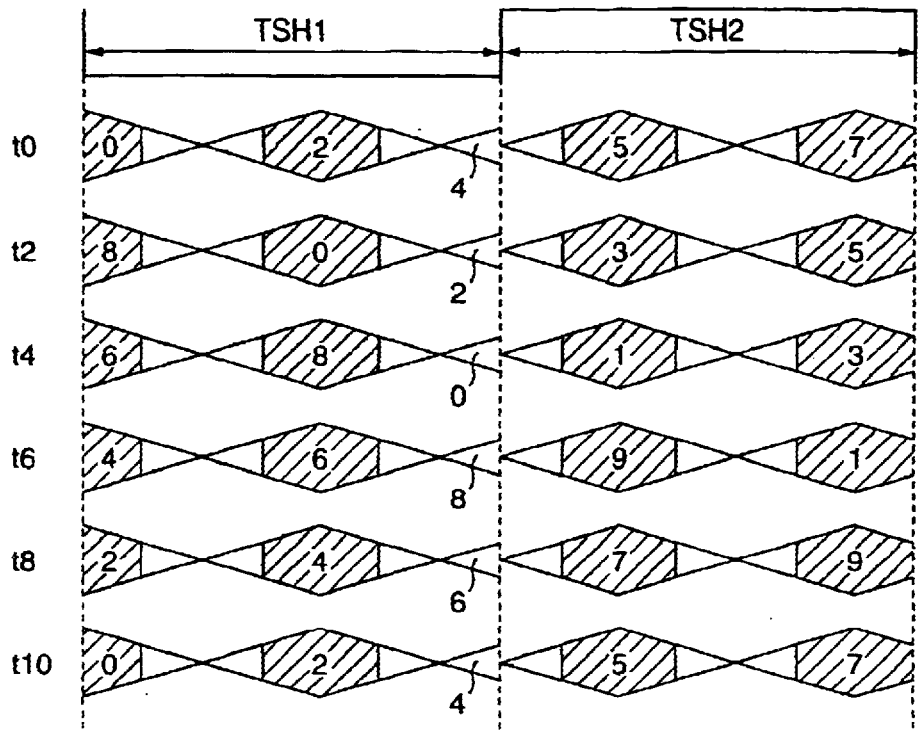
FIGS. 17A and 17B illustrate phase shift at the speed coefficient n=8 in EP mode.

FIG. 17A illustrates diamond wave envelopes of signals reproduced at the speed coefficient n=8 in EP mode. The speed coefficient n=8 is given by the equation (8) where i=1, m=0 an also the second member is negative, that is, −2/(2i−1).

Figure 17B:
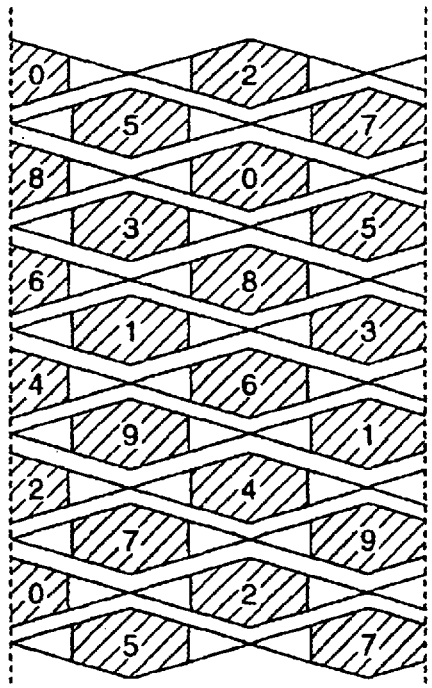

The diamond waves of FIG. 17A are shifted as shown in FIG. 17B, for example, the diamond wave at the track No. T0 and that at the track No. T5 are shifted by a half cycle. The same is true for the diamond waves at the track Nos. T1 and T6; T2 and T7; T3 and T8; and T4 and T9. All the areas in one frame can be updated, and the phase shift returns at time t10 to the initial state (time t0). This means that the frame updating cycle corresponds to 10 tracing periods. The equation (8) offers quicker frame data updating than the equation (7) due to the fact that data on the areas of one frame is recorded on both the track Nos. T0 and T5; T1 and T6; T3 and T7; T4 and T8; and T5 and T9.

Disclosed below is variable speed reproduction using the magnetic heads 1 and 3.

Fine images are reproduced by the magnetic head 1 with the equation (7). Because the equation (7) is given on the basis of the fact that, in FIG. 14, the distance between the points P02 and Pn corresponds to "n" tracks. This is also true for the magnetic head 1 for variable reproduction when the magnetic head 3 is also used.

Figure 18:
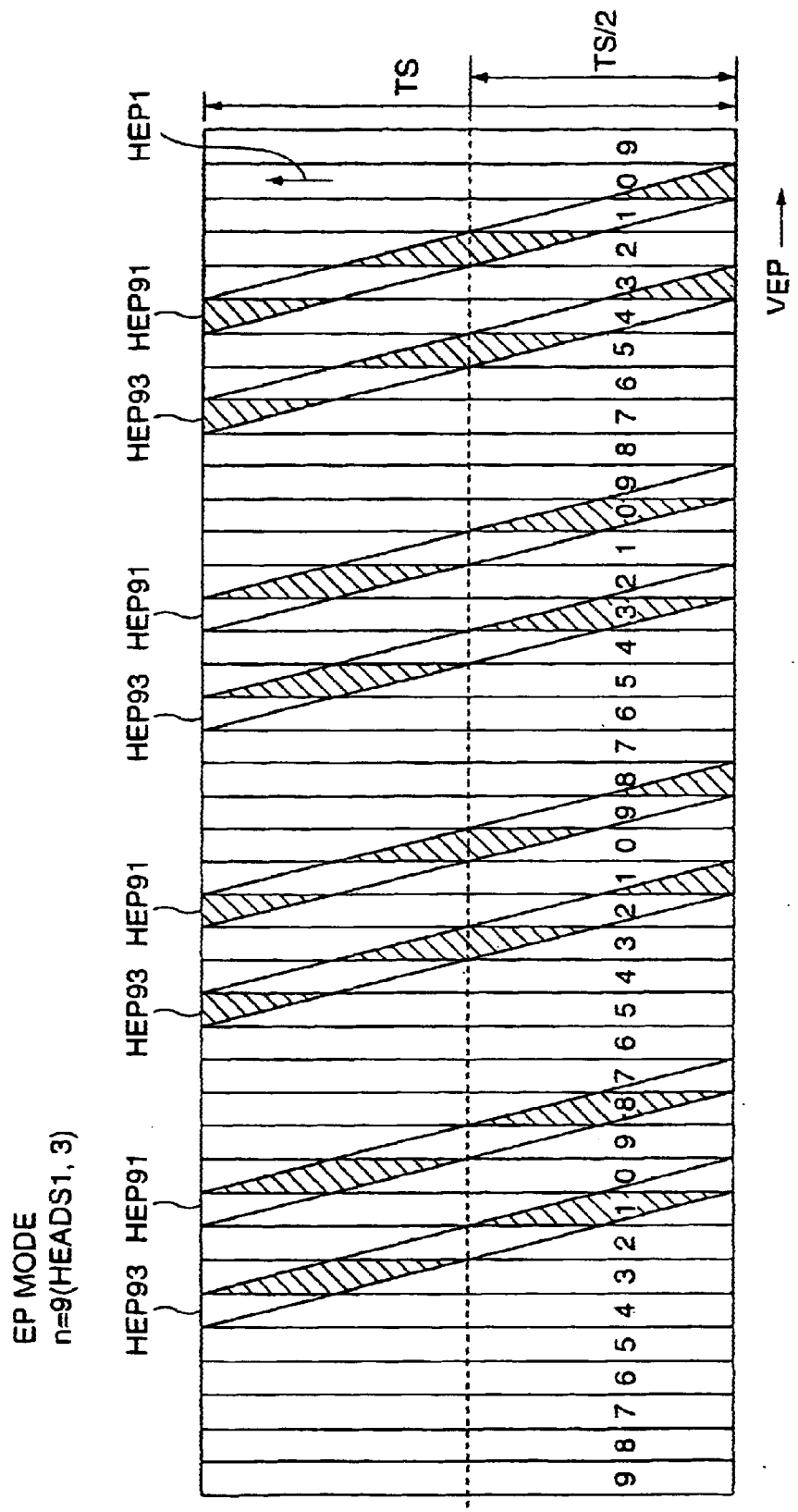
FIG. 18 illustrates paths traced by magnetic heads and tracks recorded on a magnetic tape in EP mode.

Illustrated in FIG. 18 are paths HEP91 and HEP93 traced by the magnetic heads 1 and 3, respectively, at the speed coefficient "n"=9 for discussion of signal waveforms reproduced by the magnetic head 3. The speed coefficient "n"=9 is given by the equation (7) where i=m=1 and the second member is negative, that is, −1/i. The path traced by the magnetic head 1 in the normal reproduction is indicated by an arrow HEP1. Each block depicts one track.

Figure 19:
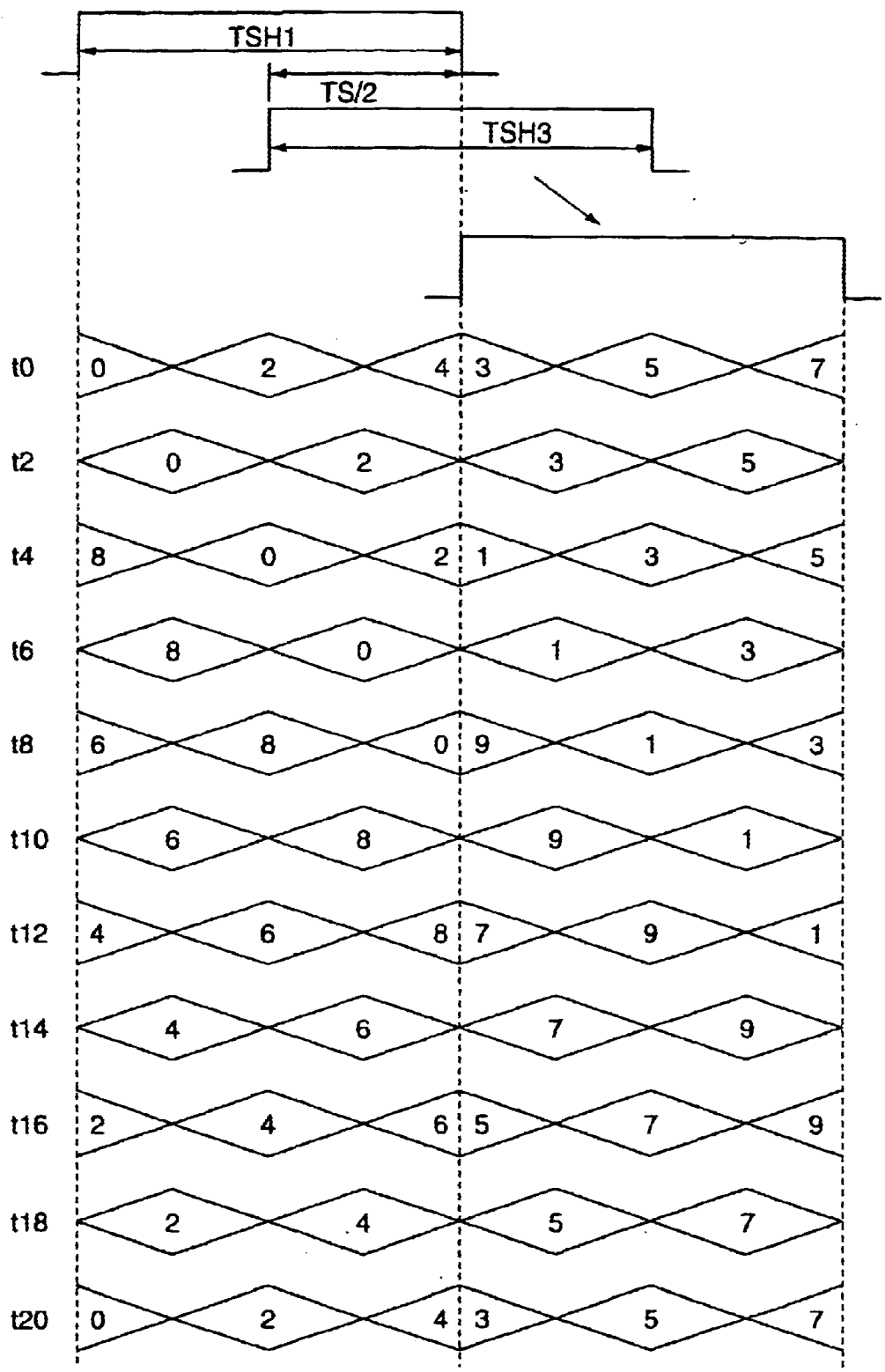
FIG. 19 illustrates phase shift at the speed coefficient n=9 in EP mode.

The magnetic head 3 starts tracing the magnetic tape 50 at the position shifted from the magnetic head 1 by one track when the tracing period TS for the magnetic head 1 reaches the half (TS/2). This tracing timing of the magnetic heads 1 and 3 reproduces diamond wave signal envelopes as shown in FIG. 19. The tracing period TSH3 for the magnetic head 3 is shifted by TS/2 from its original position for better understanding.

As obvious from FIG. 19, every condition for a half cycle shift of the diamond waves by the magnetic head 3 is met. Therefore, all the areas in one frame can be updated, and the phase shift returns at time t20 to the initial state (time to).

Figure 20:
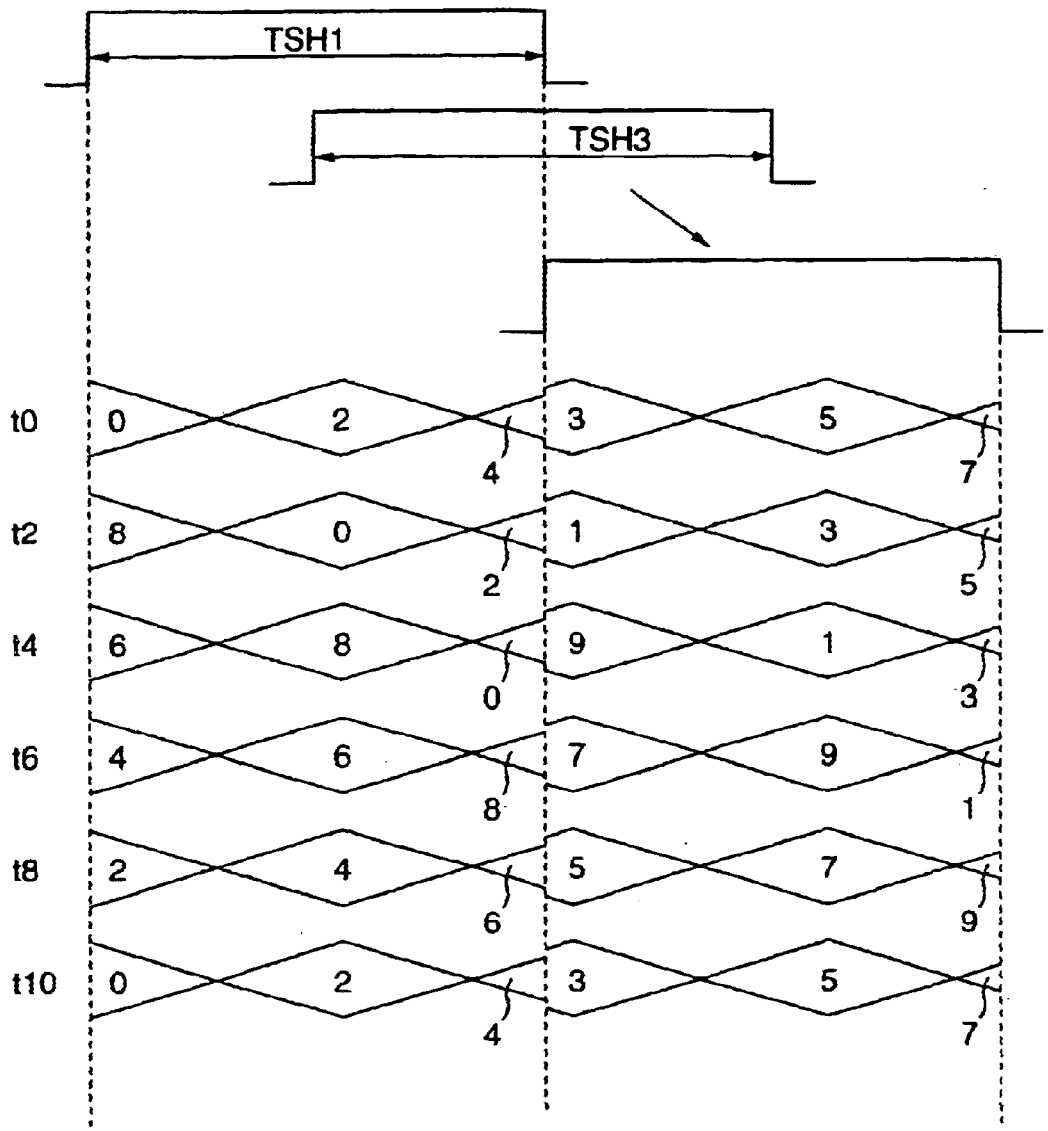
FIG. 20 illustrates phase shift at the speed coefficient n=8 in EP mode.

Illustrated in FIG. 20 are diamond wave signal envelopes reproduced by variable reproduction at the speed coefficient n=8 given by the equation (8) where i=1, m=0 and the second member is negative, that is, −2/(2i−1).

The phase shift returns at time t10 to the initial state (time t0). However, as understood from FIG. 20, a portion of a frame is not updated, that is, some areas in one frame corresponding to the term for lower level reproduced diamond waves are not updated. This is because the equation (8) is not established when the magnetic head 3 is used instead of the magnetic head 2.

The equation (8) offers a half cycle shift between diamond waves corresponding to the track Nos. 0, 2, 4, 6 and 8 reproduced by the magnetic head 1, and those corresponding to the track Nos. 5, 7, 9, 1 and 3 reproduced by the magnetic head 2. The half cycle shift is a shift by a half cycle between diamond waves corresponding to even track Nos., and those corresponding to odd track Nos., for the same areas in one frame. This results in no fine images being reproduced by the magnetic heads 1 and 3 at any speed coefficient given by the equation (8).

Figure 21:
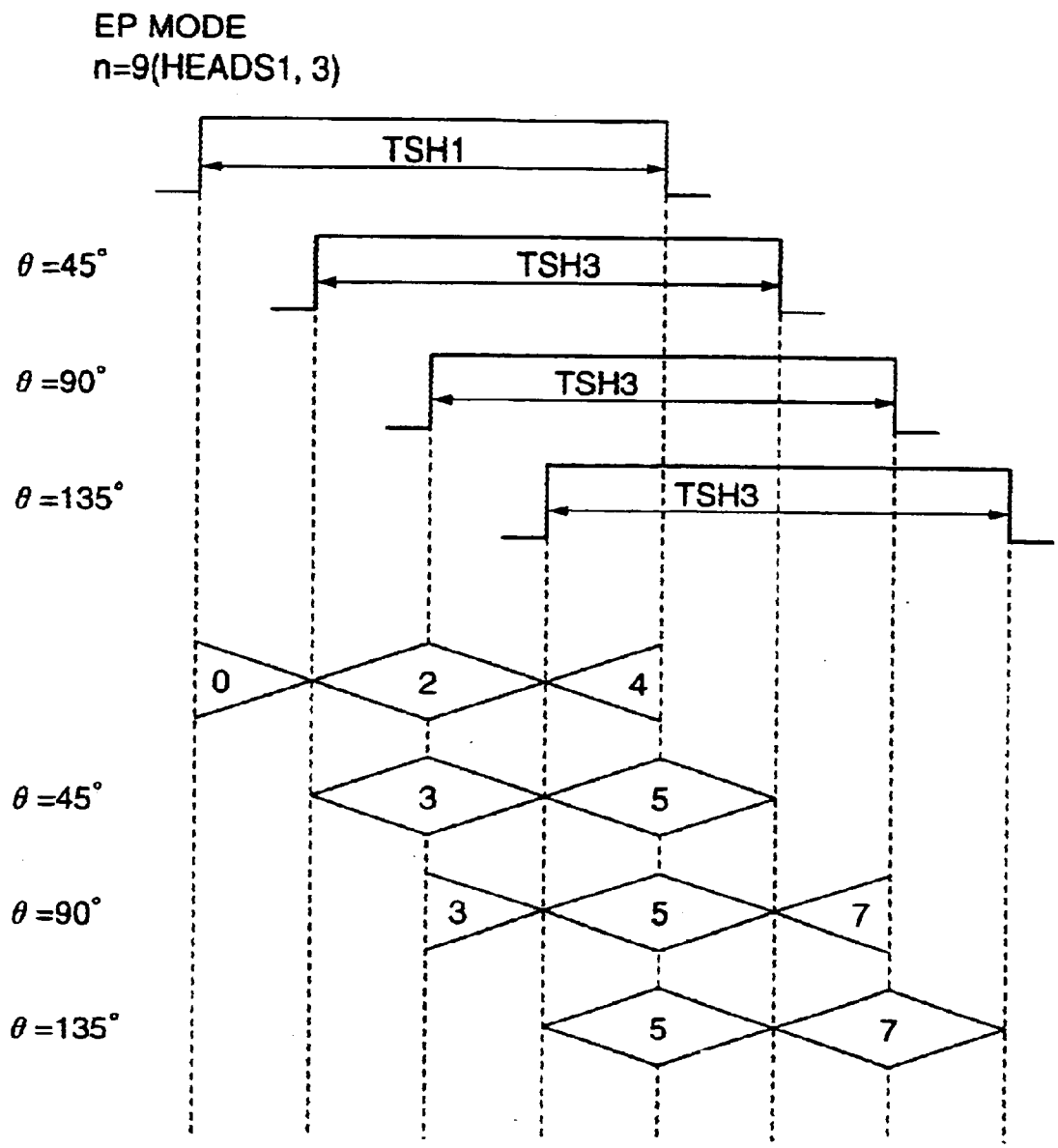
FIG. 21 illustrates another phase shift at the speed coefficient n=9 in EP mode.

The magnetic head 3 is spaced 90 (θ) degrees apart from the magnetic head 1 as shown in FIG. 2A in the embodiments disclosed above. However, any angle θ other than 90 degrees can be employed that results in the same as those all discussed above. This is shown in FIG. 21 where diamond wave signal envelopes by the magnetic heads 1 and 3 are always in phase due to the relative positional relationship between the two heads without respect to the angle θ. In other words, when the magnetic head 1 produces the maximum output, the magnetic head 3 also produces the maximum output.

It is understood from the foregoing description that the finest images can be reproduced at any speed coefficient given by the equation (8) by the magnetic heads 1 and 2 in EP mode.

Furthermore, as understood from FIGS. 16 and 19, at any speed coefficient "n" given by the equation (7), all the areas in one frame can be updated, and the phase shift returns at time t20 to the initial state (time t0), that is, the updating cycle corresponds to 20 tracing periods, even by means of only one of the signals reproduced by the three magnetic heads 1, 2 and 3. This is because, in EP mode, signals can be reproduced from all the areas in one frame, even from only even- or odd-numbered tracks.

On the other hand, as understood from FIGS. 17 and 20, at any speed coefficient "n" given by the equation (8), a portion of a frame cannot be updated by means of only one of the signals reproduced by the three magnetic heads 1, 2 and 3. Furthermore, a portion of a frame cannot be updated by means of the signals reproduced by the magnetic heads 1 and 3. Therefore, the magnetic heads 1 and 2 are indispensable for variable speed reproduction at any speed coefficient "n" given by the equation (8).

Discussed below is an allowable range of the variable speed "n".

The equations (7) and (8) are modified as shown below by insertion of a variable α that indicates an allowable range of the variable speed "n" (where α=0 corresponds to no error):

$$n=10m/i\pm(1+\alpha)/i \quad (7a)$$

$$n=10(2m+1)/(2i-1)\pm 2(1+\alpha)/(2i-1) \quad (8a)$$

The equation (8a) is modified to $$n=10-2(1+\alpha) \quad (9)$$

when, in the equation (8a), i=1 and m=0, and the second member is negative, that is, −2(1+α)/(2i−1).

In the equation (9), the more the variable α increases in negative, the more the speed coefficient "n" comes close to the integer ten, or the smaller the phase shift of diamond wave signal envelops from the half cycle. The smaller the phase shift of diamond waves from the half cycle, the larger the portions of reproduced signals overlap with each other. This results in decrease in frame data updating rate.

Now, the updating time TUP is referred to as a period for completion of updating one frame still image to another one frame still image. Then, TUP=10TS (10 tracing periods) when α=0 as discussed with reference to FIGS. 17A and 17B. The updating time TUP is expressed as below as a function of α.

$$TUP=10TS/(1+\alpha) \quad (10)$$

Tolerance of up to TUP×1.67(5/3) when α=0 gives $$10TS\times(5/3)\geq 10TS/(1+\alpha)$$

that leads α≧−0.4.

On the other hand, the more the variable α increases in positive, the larger the phase shift of diamond wave signal envelops from the half cycle. This requires small reproduced signal portions with the level lower than the maximum level 50% for frame data updating. The minimum reproduced signal level LMIN is 50% when α=0, and is expressed as below as a function of the variable α.

$$LMIN=50(1+\alpha) \quad (11)$$

The smaller the reproduced signal level less than 30% of the maximum level, the higher the error rate rapidly. The tolerance of the signal level to 30% leads 30≦50(1+α). Thus, α≦0.4.

The foregoing discussion leads −0.4≦α≦0.4 that is the allowable range for the speed coefficient "n". Therefore, the speed coefficient "n" is preferably set to the value given by the equation (7) or (8). Or, it may be set to any value given by the equation (7a) or (8a) in which the absolute value of the variable α is set to 0.4 or less, which is the allowable range discussed above. The variable α is preferably increased up to 0.4 when a reduction in data updating time TUP should be done first. On the other hand, it may be decreased down to −0.4 when errors of reproduced signals should be reduced first. The allowable range −0.4≦α≦0.4 is obtained for recording such that each frame signal of a video signal is divided into ten tracks in SP mode as the standard mode. Although not disclosed, it is understood by those skilled in the art that allowable ranges for recording tracks other than ten tracks can be obtained in the same way as discussed above.

The foregoing embodiments are disclosed in which the magnetic tape 50 surrounds the rotary head 40 for 180 degrees as shown in FIG. 2A to record video signals for full track width for better understanding. However, it is 174 degrees according to DV standard to record video signals for approximately 84% of each track width.

The image tracing period TSV for actually reproducing video signals, that corresponds to the tracing period TS discussed so far, is given by the following equation:

$$TSV=TS\times 174/180\times 0.84=0.81TS$$

Figure 22:
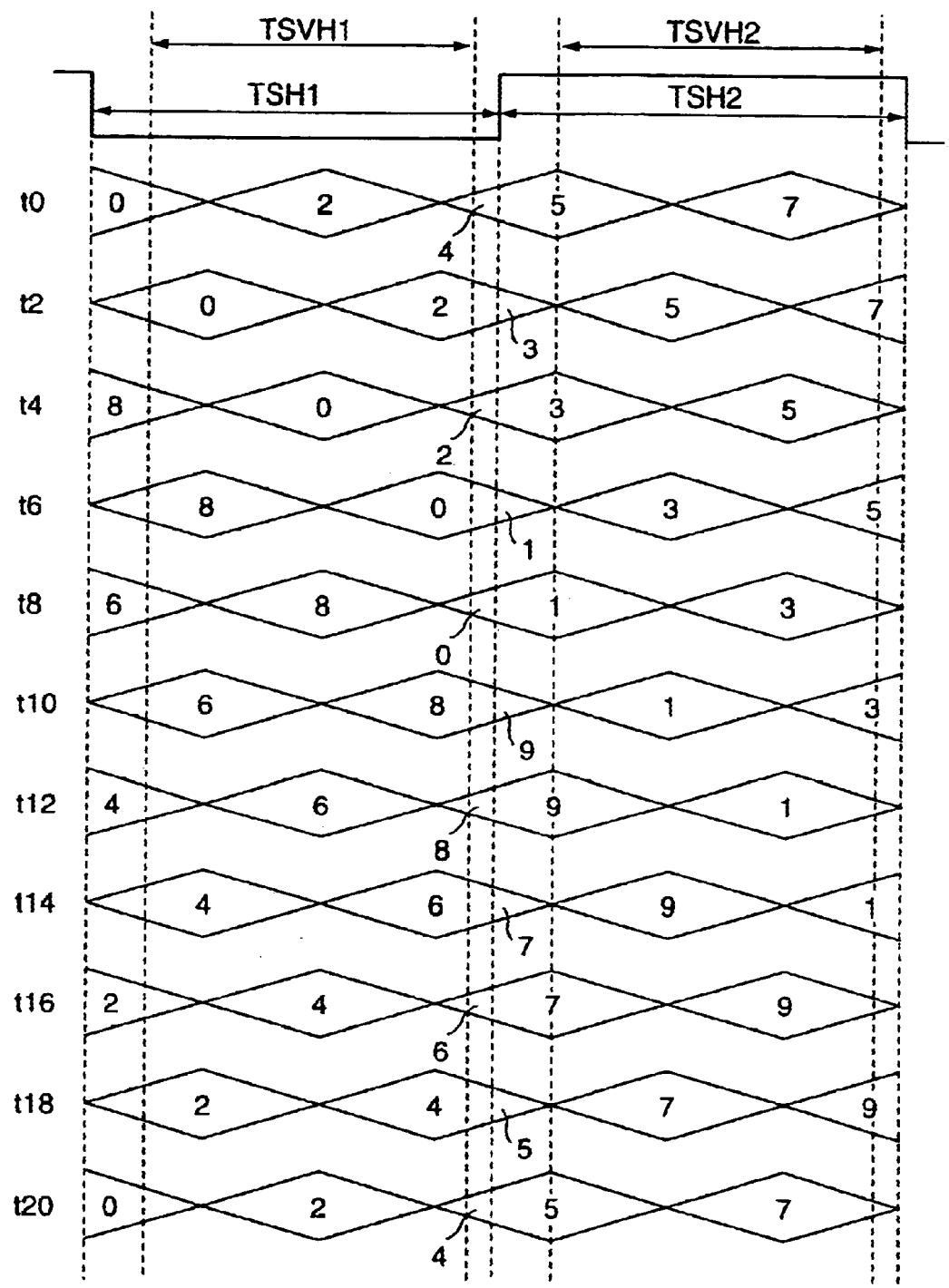
FIG. 22 illustrates phase shift at the speed coefficient n=4.5 in SP mode.

The image tracing period TSV (TSVH1 and TSVH2 for the magnetic heads 1 and 2, respectively) is illustrated in FIG. 22 in which the speed coefficient "n" is set to 4.5 in SP mode. FIG. 22 shows that data on all the areas in one frame can be updated for 20 tracing periods even though the terms for reproducing video signals are limited within TSVH1 and TSVH2. This means that the speed coefficient setting discussed in the foregoing embodiments can be applied to reproduction in which a magnetic tape surrounds a rotary head for any angle other than 180 degrees or reproduction of video signals that have been recorded as a portion of each track (or recorded such that they are separated in one track).

In the foregoing embodiments, the tape speed in EP mode is a half of that for SP mode when this is set as the standard mode. Furthermore, in the embodiments, a relative positional relationship between the magnetic heads 1 and 3 means a height H (FIG. 2B) of the magnetic head 3 relative to the magnetic head 1 is given by WT×θ/360 where WT and θ denote a track width and an angular space between the magnetic heads 1 and 3, respectively, as shown in FIGS. 2A and 2B.

It is understood by those skilled in the art that the foregoing description is preferred embodiments and that various changes and modifications may be made in the present invention without departing from the spirit and scope thereof.

In detail, the foregoing description is made for a VTR that is capable of recording and reproduction in SP and EP modes under NTSC system. However, the present invention can also be applied to LP and ELP modes according to DV standards. The LP mode offers recording and reproduction with no recording data rate change but tape speed ⅔ of that in SP mode. The ELP mode offers recording and reproduction with recording data rate ½ of and tape speed ⅔ of that in LP mode. The ELP mode is a half speed mode of LP mode when it is set as the standard mode. Speed coefficient setting for EP mode that is already described can be applied to variable reproduction in ELP mode.

Tape speed in ELP mode can be given by the equation below when SP mode is set as the standard mode.

$$VREF \times (2/3) \times (1/2) = VREF/3$$

This means ELP mode offers tape speed ⅔ of that in SP mode. In other words, for VTRs capable of recording and reproduction in SP, LP and ELP modes, tape speed in ELP mode is ⅔ of that in SP mode when it is set as the standard mode.

Different from NTSC standards, according to PAL (625 scanning lines per 50 sec.) standards, one frame video signals are recorded on magnetic tapes so that the signals are divided into 12 tracks.

For PAL standards, the equations (2), (7) and (8) are generalized for one frame recording so that one frame is divided into N frame portions, to give the following equations (12), (13) and (14):

$$n = Nm/2i \pm 1/2i \quad (12)$$

$$n = Nm/i \pm 1/i \quad (13)$$

$$n = N(2m+1)/(2i-1) \pm 2/(2i-1) \quad (14)$$

The EP mode reproduces fine images with the speed coefficient "n" that is given by the equation (13) or (14) or any value close to the value given by the equation (13) or (14).

The least common multiple nMIN when the variable "i" is set to 1 is the speed coefficient (N−2) or (−N+2), when i=1 and m=0 or −1, respectively, in the equation (14). The variable "i" is preferably set to 1 when the absolute value of a required speed coefficient is (N−2) or more. On the other hand, the variable "i" is preferably set to 2 or more when the absolute value of a required speed coefficient is less than (N−2).

Reproduction by means of the magnetic heads 1 and 2 with the speed coefficient "n" given by the equation (14) offers the shortest frame data updating time TUP. Any one or a combination of two of the magnetic heads 1, 2 and 3 with the speed coefficient "n" given by the equation (13) can reproduce relatively fine images.

The present invention is further applicable to helical-scanning type-VTRs for recording one frame image so that it is divided into several tracks other than VTRs according to DV standards.

As disclosed above, according to the present invention, a first, a second and a third magnetic heads are arranged on a rotary drum as follows: The first and second magnetic heads have different gap azimuth angles and are spaced 180 degrees apart from each other on the rotary head. The third magnetic head has the same gap azimuth angle as that of the second magnetic head and a specific relative positional relationship with the first magnetic head on the rotary head.

Recording of each frame signal of a video signal is controlled as follows: The frame signal is divided into N (N being a integer of two or more) slant tracks on a magnetic tape at a standard tape speed in a standard mode; it is divided into N/2 slant tracks at a tape speed ½ of the standard speed in ½ speed mode; or it is divided into N/2 slant tracks at a tape speed ⅓ of the standard speed in ⅓ speed mode.

Reproduction of the frame signal is carried out at a tape speed n (n being a speed coefficient and n≠1) times the tape speed at which the frame signal has been recorded in at least either the ½ or the ⅓ speed mode. The speed coefficient n is set to a value included in a predetermined allowable range or given by at least either an equation n=N(2m+1)/(2i−1) ±2/(2i−1) or n=Nm/i±1/i where a variable i is an integer from 1 to 10, and a variable m is an integer.

The ten track-recording at the standard tape speed in the standard mode can be carried out by means of the first and second magnetic heads. The N/2 track-recording at the tape speed ½ or ⅓ of the standard speed in ½ or ⅓ speed mode can be carried out by means of the first and third magnetic heads. The reproduction of the signals recorded in ½ or ⅓ speed mode can be carried out by means of the first and second magnetic heads at a tape speed different from that for ½ or ⅓ speed mode.

Therefore, the present invention achieves adequate phase relationships among diamond wave envelopes of reproduced signals and thus can reproduce fine images.

What is claimed is:

1. An apparatus for recording and reproducing a video signal to and from a magnetic tape, comprising:

a controller to selectively control recording of each frame signal of the video signal in such a way that the frame signal is divided into N (N being an integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode, and to control reproduction in such a way that the frame signal is reproduced at a tape speed n (n being a speed coefficient and n≠1) times the tape speed at which the frame signal has been recorded in at least either the ½ or the ⅓ speed mode, the speed coefficient n being set to a value included in a predetermined range or given by at least either an equation (1) or (2):

$$n = N(2m+1)/2i-1) \pm 2/(2i-1) \quad (1)$$

$$n = Nm/i \pm 1/i \quad (2)$$

where a variable i is an integer from 1 to 10, and a variable m is an integer; and wherein the variable i is set to 1 for the speed coefficient n that is (N−2) or more, whereas the variable i is set to 2 or more for the speed coefficient n that is less than (N−2).

2. An apparatus for recording and reproducing a video signal to and from a magnetic tape, comprising:

a controller to selectively control recording of each frame signal of the video signal in such a way that the frame signal is divided into N (N being an integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode, and to control reproduction in such a way that the frame signal is reproduced at a tape speed n (n being a speed coefficient and n≠1) times the tape speed at which the frame signal has been recorded in at least either the ½ or the ⅓ speed mode, the speed coefficient n being set to a value included in a predetermined range or given by at least either an equation (1) or (2):

$$n=N(2m+1)/(2i-1)\pm 2/(2i-1) \quad (1)$$

$$n=Nm/i\pm 1/i \quad (2)$$

where a variable i is an integer from 1 to 10, and a variable m is an integer; and wherein the speed coefficient n is set to a value given by the equation (1) or another value included in a predetermined range given by an equation (3); or a value given by the equation (2) or another value included in a predetermined range given by an equation (4):

$$n=N(2m+1)/(2i-1)\pm 2/(1+\alpha)/(2i-1) \quad (3)$$

$$n=10m/i\pm (1+\alpha)/i \quad (4)$$

where −0.4≦α≦0.4.

3. An apparatus for recording and reproducing a video signal to and from a magnetic tape, comprising;

a first magnetic head and a second magnetic head having different gap azimuth angles and being spaced 180 degrees apart from each other on a rotary head;

a third magnetic head having the same gap azimuth angle as the gap azimuth angle of the second magnetic head and having a specific relative positional relationship with the first magnetic head on the rotary head; and a controller to selectively control recording of each frame signal of the video signal in such a way that the frame signal is divided into N (N being a integer of two or more) slant tracks on the magnetic tape by the first and second magnetic heads at a standard tape speed in a standard mode, the frame signal is divided into N/2 slant tracks by the first and third magnetic heads at a tape speed ½ of the standard speed in ½ speed mode, or the frame signal is divided into N/2 slant tracks by the first and third magnetic heads at a tape speed ⅓ of the standard speed in ⅓ speed mode, and to control reproduction in such a way that the frame signal is reproduced by the first and second magnetic heads at a tape speed different from the tape speed at which the frame signal has been recorded in at least either the ½ or the ⅓ speed mode.

4. The apparatus according to claim 3, wherein a speed coefficient n for the reproduction at the tape speed different from the tape speed for recording in either the ½ or the ⅓ speed mode is set to a value included in a predetermined range or given by an equation n=N(2m+1)/(2i−1)±2/(2i−1) where a variable i is an integer from 1 to 10, and a variable m is an integer.

5. The apparatus according to claim 4, wherein the predetermined range is given by an equation n=N(2m+1)/(2i−1)±2/(1+α)/(2i−1) where −0.4≦α≦0.4.

6. An apparatus for recording and reproducing a video signal to and from a magnetic tape, comprising;

a first magnetic head and a second magnetic head having different gap azimuth angles and being spaced 180 degrees apart from each other on a rotary head;

a third magnetic head having the same gap azimuth angle as the gap azimuth angle of the second magnetic head and having a specific relative positional relationship with the a first magnetic head on the rotary head; and a controller to selectively control recording of each frame signal of the video signal in such a way that the frame signal is divided into N (N being a integer of two or more) slant tracks on the magnetic tape by the first and second magnetic heads at a standard tape speed in a standard mode, the frame signal is divided into N/2 slant tracks by the first and third magnetic heads at a tape speed ½ of the standard speed in ½ speed mode, or the frame signal is divided into N/2 slant tracks by the first and third magnetic heads at a tape speed ⅓ of the standard speed in ⅓ speed mode, and to control reproduction in such a way that the frame signal is reproduced by one of or two of the first, the second and the third magnetic heads at a tape speed n (n being a speed coefficient and n≠1) times the tape speed at which the frame signal has been recorded in at least either the ½ or the ⅓ speed mode, the speed coefficient n being set to a value included in a predetermined range or given by an equation n=Nm/i±1/i where a variable i is an integer from 1 to 10, and variable m is an integer.

7. The apparatus according to claim 6, wherein the predetermined range is given by an equation n=10m/i±(1+α)/i where −0.4≦α≦0.4.

8. An apparatus for reproducing a video signal from a magnetic tape, comprising:

a controller to control reproduction of each frame signal of the video signal that has been recorded in such a way that the frame signal is divided into N (N being an integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode, the frame signal being reproduced at a tape speed n (n being a speed coefficient and n≠1) times the tape speed at which the frame signal has been recorded in at least either the ½ or the ⅓ speed mode, the speed coefficient n being set to a value included in a predetermined range or given by at least either an equation (1) or (2):

$$n=N(2m+1)/(2i-1)\pm 2/(2i-1) \quad (1)$$

$$n=Nm/i\pm 1/i \quad (2)$$

where a variable i is an integer from 1 to 10, and a variable m is an integer; and wherein the variable i is set to 1 for the speed coefficient n that is (N−2) or more, whereas the variable i is set to 2 or more for the speed coefficient n that is less than (N−2).

9. An apparatus for reproducing a video signal from a magnetic tape, comprising:

a controller to control reproduction of each frame signal of the video signal that has been recorded in such a way that the frame signal is divided into N (N being an integer of two or more) slant tracks on the magnetic tape at a standard tape speed in a standard mode, the frame signal is divided into N/2 slant tracks at a tape speed ½ of the standard speed in ½ speed mode, or the frame signal is divided into N/2 slant tracks at a tape speed ⅓ of the standard speed in ⅓ speed mode, the frame signal being reproduced at a tape speed n (n being a speed coefficient and n≠1) times the tape speed at which the frame signal has been recorded in at least either the ½ or the ⅓ speed mode, the speed coefficient n being set to a value included in a predetermined range or given by at least either an equation (1) or (2):

$$n = N(2m+1)/(2i-1) \pm 2/(2i-1) \qquad (1)$$

$$n = Nm/i \pm 1/i \qquad (2)$$

where a variable i is an integer from 1 to 10, and a variable m is an integer; and wherein the speed coefficient n is set to a value given by the equation (1) or another value included in a predetermined range given by an equation (3); or a value given by the equation (2) or another value included in a predetermined range given by an equation (4):

$$n = N(2m+1)/(2i-1) \pm 2/(1+\alpha)/(2i-1) \qquad (3)$$

$$n = 10m/i \pm (1+\alpha)/i \qquad (4)$$

where $-0.4 \leq \alpha \leq 0.4$.

10. An apparatus for reproducing a video signal from a magnetic tape, comprising:

a first magnetic head and a second magnetic head having different gap azimuth angles and being spaced 180 degrees apart from each other on a rotary head;

a third magnetic head having the same gap azimuth angle as the gap azimuth angle of the second magnetic head and having a specific relative positional relationship with the first magnetic head on the rotary head;

a controller to control reproduction of each frame signal of the video signal, the frame signal having been recorded by the first and second magnetic heads in a standard mode or the first and third magnetic heads in ½ or ⅓ speed mode in such a way that the frame signal is divided into N (N being an integer of two or more) slant tracks on the magnetic tape at a standard tape speed in the standard mode, the frame signal is divided into N/2 slant tracks at the tape speed ½ of the standard speed in ½ speed mode, or the frame signal is divided into N/2 slant tracks at the tape speed ⅓ of the standard speed in ⅓ speed mode, the frame signal being reproduced by the first and second magnetic heads at a tape speed different from the tape speed at which the frame signal has been recorded in either the ½ or the ⅓ speed mode;

wherein a speed coefficient n for the reproduction at the tape speed different from the tape speed for recording in either the ½ or the ⅓ speed mode is set to a value included in a predetermined range or given by an equation $n = N(2m+1)/(2i-1) \pm 2/(2i-1)$ where a variable i is an integer from 1 to 10, and a variable m is an integer; and wherein the predetermined range is given by an equation $n = N(2m+1)/(2i-1) \pm 2/(1+\alpha)/(2i-1)$ where $-0.4 \leq \alpha \leq 0.4$.

11. An apparatus for reproducing a video signal from a magnetic tape, comprising:

a first magnetic head and a second magnetic head having different gap azimuth angles and being spaced 180 degrees apart from each other on a rotary head;

a third magnetic head having the same gap azimuth angle as the gap azimuth angle of the second magnetic head and having a specific relative positional relationship with the first magnetic head on the rotary head;

a controller to control reproduction of each frame signal of the video signal that has been recorded in such a way that the frame signal is divided into N (N being an integer of two or more) slant tracks on the magnetic tape by the first and second magnetic heads at a standard tape speed in a standard mode, the frame signal is divided into N/2 slant tracks by the first and third magnetic heads at a tape speed ½ of the standard speed in ½ speed mode, or the frame signal is divided into N/2 slant tracks by the first and third magnetic heads at a tape speed ⅓ of the standard speed in ⅓ speed mode, and to control reproduction in such a way that the frame signal is reproduced by one of or two of the first, the second and the third magnetic heads at a tape speed n (n being a speed coefficient and n≠1) times the tape speed at which the frame signal has been recorded at least either the ½ or the ⅓ speed mode, the speed coefficient n being set to a value included in a predetermined range or given by an equation $n = Nm/i \pm 1/i$ where a variable i is an integer from 1 to 10, and a variable m is an integer; and wherein the predetermined range is given by an equation $n = 10m/i \pm (1+\alpha)/i$ where $-0.4 \leq \alpha \leq 0.4$.

* * * * *